United States Patent
Penny et al.

(10) Patent No.: US 10,525,632 B2
(45) Date of Patent: Jan. 7, 2020

(54) SYSTEMS, DEVICES, AND METHODS FOR PRECISION LOCATING AND ASSEMBLY OF ADDITIVELY MANUFACTURED COMPONENTS

(71) Applicant: Massachusetts Institute of Technology, Cambridge, MA (US)

(72) Inventors: Ryan Wade Penny, Cambridge, MA (US); Anastasios John Hart, Waban, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 63 days.

(21) Appl. No.: 15/636,502

(22) Filed: Jun. 28, 2017

(65) Prior Publication Data

US 2017/0368759 A1    Dec. 28, 2017

Related U.S. Application Data

(60) Provisional application No. 62/355,731, filed on Jun. 28, 2016.

(51) Int. Cl.
*B29C 64/40* (2017.01)
*B33Y 40/00* (2015.01)
(Continued)

(52) U.S. Cl.
CPC ............ *B29C 64/40* (2017.08); *B22F 3/1055* (2013.01); *B22F 3/24* (2013.01); *B22F 5/00* (2013.01);
(Continued)

(58) Field of Classification Search
CPC ..... B29C 64/40; B29C 64/386; B29C 64/393; B29C 64/106; B29C 64/112;
(Continued)

(56) References Cited

U.S. PATENT DOCUMENTS 5,769,554 A    6/1998 Slocum
6,193,430 B1*  2/2001 Culpepper .............. B23P 19/10
                                                      403/13
(Continued)

OTHER PUBLICATIONS

Print your own LEGOcompatible bricks, By: Christopher Finke, Jan. 27, 2015 (Year: 2015).*

(Continued)

*Primary Examiner* — Robert E Fennema
*Assistant Examiner* — Jigneshkumar C Patel
(74) *Attorney, Agent, or Firm* — Nutter McClennen & Fish LLP

(57) ABSTRACT

Methods, systems, and devices for precision locating additively manufactured components for assembly and/or post processing manufacturing are provided for herein. In some embodiments, at least one component can be additively manufactured to include one or more kinematic features on one or more surfaces of the component. The kinematic feature(s) can be configured to engage complementary kinematic feature(s) formed in a second component so the two components can form an assembly. Alternatively, the kinematic feature(s) can be configured to engage complementary kinematic feature(s) associated with a post-processing machine such that the one or more post-processing actions can be performed on the component after the component is precisely located with respect to the machine by way of the kinematic features of the component and associated with the machine. A variety of systems and methods that utilize kinematic features are also provided.

31 Claims, 17 Drawing Sheets

(51) Int. Cl.
| | |
|---|---|
| B22F 5/00 | (2006.01) |
| B22F 3/24 | (2006.01) |
| B22F 3/105 | (2006.01) |
| B33Y 80/00 | (2015.01) |
| G05B 19/4099 | (2006.01) |
| B33Y 50/02 | (2015.01) |
| B29C 64/386 | (2017.01) |
| B29C 64/393 | (2017.01) |

(52) U.S. Cl.
CPC .......... *B29C 64/386* (2017.08); *B29C 64/393* (2017.08); *B33Y 40/00* (2014.12); *B33Y 50/02* (2014.12); *B33Y 80/00* (2014.12); *G05B 19/4099* (2013.01); *B22F 2003/1057* (2013.01); *B22F 2003/1058* (2013.01); *B22F 2005/005* (2013.01); *B22F 2999/00* (2013.01); *G05B 2219/35134* (2013.01); *G05B 2219/49007* (2013.01); *G05B 2219/49023* (2013.01); *Y02P 10/295* (2015.11); *Y02P 80/40* (2015.11)

(58) Field of Classification Search
CPC ... B29C 64/118; B29C 64/188; B29C 69/001; B33Y 40/00; B33Y 80/00; B33Y 50/02; B22F 3/1055; B22F 5/00; B22F 3/24; B22F 2005/005; B22F 2999/00; B22F 2003/1058; B22F 2003/1057; G05B 19/4099; G05B 2219/49023; G05B 2219/35134; G05B 2219/49007; Y02P 10/295; Y02P 80/40
USPC ......... 700/118; 264/162, 163, 294, 296, 308
See application file for complete search history.

(56) References Cited

U.S. PATENT DOCUMENTS

| | | | |
|---|---|---|---|
| 6,736,691 B1 | 5/2004 | Bach | |
| 2008/0109103 A1 | 5/2008 | Gershenfeld et al. | |
| 2014/0067609 A1* | 3/2014 | Heger ................ | G06Q 30/0623 705/26.61 |
| 2015/0190724 A1 | 7/2015 | Licht Botcher et al. | |

OTHER PUBLICATIONS

[No Author Listed] Bal-tec™, All Vee Blocks (All V Blocks). 29 pages. Retrieved on Nov. 3, 2017 via the Wayback Machine, as page was archived on Mar. 21, 2016 from <https://web.archive.org/web/20160321233618/http://precisionballs.com/All_Vee_Blocks.php>.

[No Author Listed] EOS StainlessSteel 17-4PH—Highly Abrasion Resistant Stainless Steel for Medical, Materials for Metal Additive Manufacturing. EOS GmbH—Electro Optical Systems, Material data sheet, 2015, 9 pages. Retrieved on Nov. 3, 2017 via the Wayback Machine, as page was archived on Oct. 2, 2016 from <https://web.archive.org/web/20161002053606/http://www.eos.info:80/material-m>.

[No Author Listed] ExOne®, 316 Stainless Steel Infiltrated with Bronze. The ExOne Company, Apr. 21, 2016, 2 pages.

[No Author Listed] Formlabs, Clear, Photopolymer Resin for Form 1+ and Form 2, FLGPCL02 Material Properties. Formlabs, Inc., Apr. 19, 2016, 3 pages.

[No Author Listed] Renishaw, TP20. Picture of body and module, 1 page. Originally accessed in Sep. 2016. Document last modified Sep. 18, 2012. Retrieved on Nov. 3, 2017 from <http://www.3dmicrosurf.ro/wp-content/uploads/2012/09/Renishaw-TP20-body-and-module.jpg>.

[No Author Listed] Stratasys, ABSplus-P430, Production-grade thermoplastic for design series 3D printers. Stratasys, Inc., 2014-2015, 2 pages. Retrieved on Nov. 3, 2017 via the Wayback Machine, as page was archived on Mar. 20, 2016 from <http://usglobalimages.stratasys.com/Main/Files/Material_Spec_Sheets/MSS_FDM_ABSplusP430.pdf>.

[No Author Listed] Thorlabs, Kinematic Bases. Thorlab, Inc., 1999-2017, 5 pages. Originally accessed in Sep. 2016. Retrieved on Nov. 3, 2017 from <https://www.thorlabs.us/newgrouppage9.cfm?objectgroup_id=1546>.

Ahn, S., et al., Standard errors of mean, variance, and standard deviation estimators. EECS Department, The University of Michigan, Jul. 24, 2003, 2 pages.

Culpepper, M.L., Design of quasi-kinematic couplings. Prescision Engineering, vol. 28, Issue 3, Jul. 2004, pp. 338-357.

Culpepper, M.L., et al., Quasi-kinematic couplings for low-cost precision alignment of high-volume assemblies. Journal of Mechanical Design, vol. 126, Issue 3, May 2004, pp. 456-463.

Finke, C., Print your own Lego-compatible bricks. Chrisfinke.com. Jan. 27, 2015, 21 Pages. Retrieved on Aug. 8, 2017 from <https://www.chrisfinke.com/2015/01/27/3d-printed-lego-compatible-bricks/>.

Hale, L.C., Friction-based design of kinematic couplings. No. UCRL-JC-131297. Lawrence Livermore National Laboratory (LLNL), Livermore, CA, 1998, 4 pages.

Hart, A.J., Design and analysis of kinematic couplings for modular machine and instrumentation structures. SM Thesis, Massachusetts Institute of Technology, Feb. 2002, 264 pages.

Hart, A.J., High-accuracy, quick-change, robot factory interface. MIT Precision Engineering Research Group, MIT, 2002, 11 pages.

International Search Report and Written Opinion for Application No. PCT/US2017/039827, dated Sep. 1, 2017 (8 Pages).

Jack, H., Force Calculations. Figure from eNotes: Manufacturing Process, Section 5.2.1.1, Engineer on a Disk, 1 page, 2010. Retrieved on Nov. 3, 2016 from <http://engineeronadisk.com/notes_manufact/images/cutting13.gif>.

Johnson, K.L., Contact mechanics. Cambridge University Press, Cambridge, UK, 1985, pp. 45-106, and 397-422.

Penny, R.W., et al., Precision locating of additively manufactured parts using embedded kinematic couplings. 2016 Summer Topical Meeting: Dimensional Accuracy and Surface Finish in Additive Manufacturing, Monday-Thursday, Jun. 27-30, 2016, Session III, Design for Additive Manufacturing, Jun. 29, 2016, 6 pages.

Slocum, A.H., Kinematic coupling design. Precision Machine Design. Prentice-Hall, Inc., A Simon & Schuster Company, Englewood Cliffs, NJ, 1992, Section 7.7, pp. 401-412.

Slocum, A., Kinematic couplings: A review of design principles and applications. International Journal of Machine Tools and Manufacture, 50.4 (2010): 310-327.

* cited by examiner

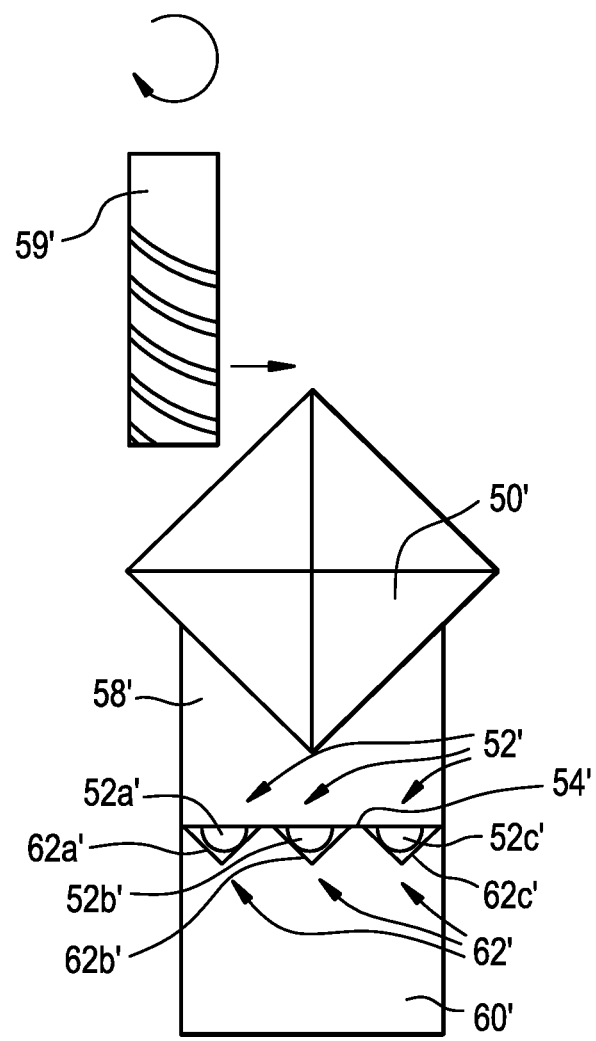

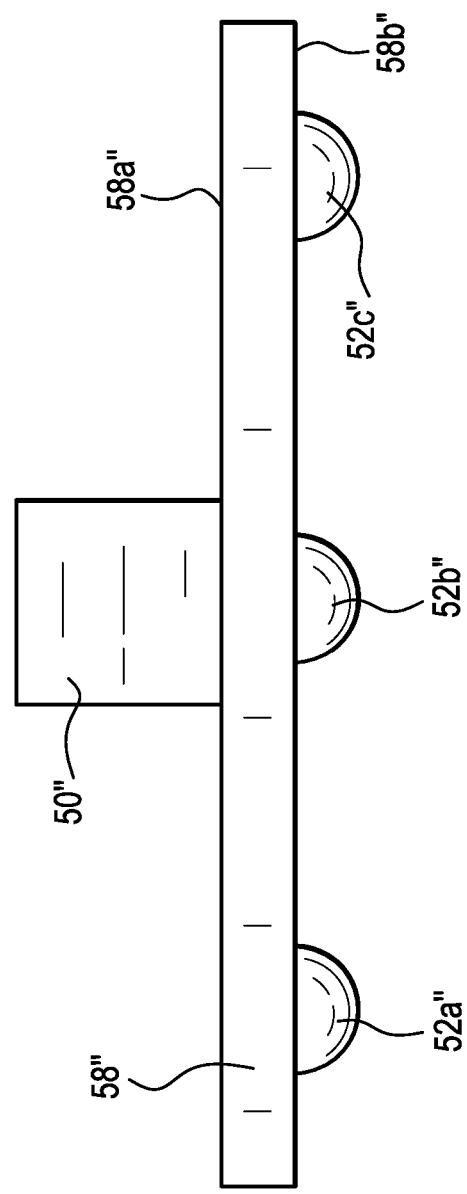

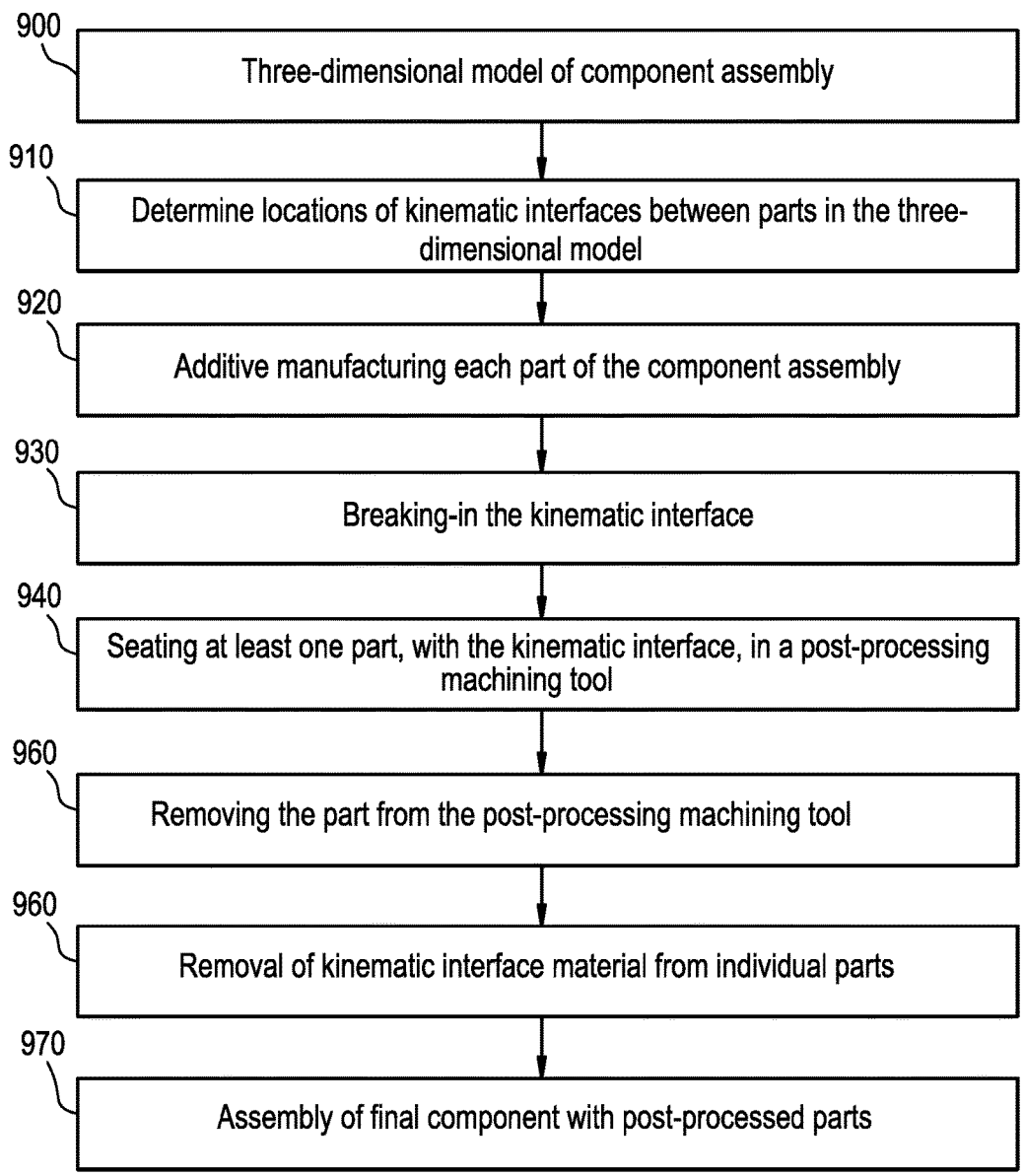

SYSTEMS, DEVICES, AND METHODS FOR PRECISION LOCATING AND ASSEMBLY OF ADDITIVELY MANUFACTURED COMPONENTS

CROSS REFERENCE TO RELATED APPLICATION

The present disclosure claims priority to U.S. Provisional Application No. 62/355,731, entitled "Precision Locating of Additively Manufactured Components," which was filed on Jun. 28, 2016, and which is incorporated by reference herein in its entirety.

GOVERNMENT RIGHTS

This invention was made with Government support under Grant No. CMMI-1547154 awarded by the National Science Foundation. The Government has certain rights in the invention.

FIELD

The present disclosure relates to systems, devices, and methods for additive manufacturing, and more particularly relates to the fabricating kinematic interfaces on surfaces of three-dimensional components during the additive manufacturing process so that the kinematic interfaces can be used to form kinematic couplings that precisely locate the printed component for further processing and/or for assembly.

BACKGROUND

Additive manufacturing (AM) is growing in popularity for rapid prototyping, short run manufacturing, and creating components with geometries that are inaccessible to conventional manufacturing methods. There are multiple known techniques for AM, such as stereolithography, material and binder jetting, fused filament fabrication, and powder bed fusion, among others. An AM process often includes building parts from selectively dispensing material (e.g., a polymer) through a nozzle or orifice, or fusing material located in a print bed. A nozzle or orifice is typically disposed on a printhead, which is maneuvered with respect to a print surface to dispense the material at prescribed locations with respect to the print surface. Multiple layers are built on top of each other to create a part or solid object, sometimes referred to herein as a component.

AM offer benefits, such as allowing for manufacturing of basic parts suitable for low-precision applications without the need for specialized fixturing or machining. However, design and manufacturing of precision components is a complex process, which printing may be but one step. Complex, precision components are subject to the limitations of the dimensional accuracy, surface finishes, and imprecise assembly associated with AM. Post-processing can aid in overcoming some of the shortfalls of AM. However, post-processing steps typically require accurate fixturing of the additively manufactured component to ensure the post-processing steps are performed accurately. Precision fixturing can be a timely and expensive process. But, if the additively manufactured component cannot be located with respect to a post-processing machine or tool in a repeatable and accurate manner, the post-processing steps can ruin the component.

Alternatively, or additionally, many components printed using AM techniques are designed as multi-component assemblies and can suffer from low placement accuracy between the parts. The low placement accuracy between the components can be the result of low machining tolerances, poor surface finishes of the individual components, and the material properties of the components themselves, among other reasons. If an assembly of additively manufactured components are not properly aligned or assembled, the resulting assembly can have unsuitable performance and/or usefulness. AM components may also be assembled with components manufactured by other methods including machining, injection molding, or casting.

Accordingly, there remains a need for improved methods, systems, and devices for producing additively manufactured parts that can be precisely and consistently located with respect to another object or tool or machine (e.g., a post-processing tool or machine), and precisely and durably located when coupling the manufactured part with another complementary part.

SUMMARY

The present disclosure generally relates to systems, devices, and methods for precisely locating three-dimensionally (3D, which is also used as an abbreviation for "three-dimensional" and other similar derivations) printed (e.g., via AM) components for assembly and/or post processing, and provides for a number of different advances in this field. As described herein, kinematic interfaces (KIs) can be fabricated as part of the AM printing process, which are in turn used to form kinematic couplings (KCs) that provide for precision location. A KI(s) of an AM printed component can be used for precision location, for example, by engaging a complementary KI(s) associated with a post-processing machine (e.g., milling machine) to form a KC(s) and set a location of the printed component with respect to the post-processing machine. This allows the printed component to be precisely located for post-processing actions performed by the post-processing machine, even in instances in which the printed component is moved and later returned for further post-processing. Additionally, subsequently printed components of the same configuration (or at least having a KI(s) similarly positioned for purposes of defining a desired location of the printed component with respect to the post-processing machine) can be precisely located in the same position, allowing for consistent post-processing treatment of multiple components. Another way by which a KI(s) of an AM printed component can be used for precision location is by engaging a complementary KI(s) associated with a second component with which the first AM printed component is to be assembled to form a KC(s). This allows for a precise and secure fit between the two components, and can lead to the formation of complex precision assemblies. The first and second components can likewise be disassembled and reassembled without losing the precise location of the two components with respect to each other.

Additional advantages afforded by the present disclosures include various ways by which a KI(s) can be modified when it is part of an AM printed component. For example, it may be advantageous to "break-in" or "reform" a KI(s), which can allow for the printed component with which the KI(s) is associated to more predictably seat with respect to another object (e.g., a post-processing tool or machine) or another component (including another 3D printed component, such as an AM printed component) to which the AM printed component mates for purposes of forming an assembly. The disclosures provided for herein also help reduce the possibility of later deformation of a KI(s) fabricated as part of an AM printed component. Further, the present disclosures provide for the AM printed components to be accurately post-processed to create precision components that have a wider industrial applicability, such as in industries that include tools and the like where precise geometric complex components are often needed.

Each of the advances, among others provided, by themselves and in any combination, allows for the manufacturing of complex precision components made from AM. The present disclosure highlights some of these advances with more particularity than others, although such highlighting by no means indicates the inventive nature of one advance or aspect in comparison to another. A person skilled in the art, in view of the present disclosure, will be able to determine numerous advances, and combinations of advances, that represent inventive subject matter.

In one exemplary method for additive manufacturing, the method includes obtaining a three-dimensional model of a component to be printed, formulating a print plan based on the three-dimensional model of the component, and printing the component based on the print plan. The print plan includes one or more planned kinematic interfaces (KIs) associated with at least one planned surface of a planned component of the print plan. The planned component of the print plan, the at least one planned surface, and the one or more planned KIs correspond to the component to be printed, at least one surface of the component to be printed, and one or more KIs to be associated with the at least one surface of the component to be printed, respectively. Printing the component based on the print plan results in the at least one surface of the component having one or more kinematic surfaces associated with the at least one surface.

In some embodiments, the method can include deforming the kinematic interface(s) by imparting a predetermined load on the kinematic interface(s) over a period of time. Alternatively, or additionally, the method can include reforming the kinematic interface(s) by directing the kinematic interface(s) against a contact surface to change at least one of a shape and a surface texture of the kinematic interface(s). In some such instances, reforming kinematic interface(s) can additionally include heating the contact surface to cause at least a portion of the kinematic interface(s) to more easily change at least one of the shape and the surface texture.

The method can include engaging the kinematic interface(s) with one or more complementary kinematic interface(s) of a second component to couple the printed component to the second component. The second component can be any object or device, and can be, but does not have to be, printed using three-dimensional printing techniques, such as AM. A kinematic interface of the of the one or more kinematic interfaces and a complementary kinematic interface of the one or more complementary kinematic features are configured such that at least six distinct points on the kinematic interface receive a load to maintain a stationary configuration of the printed component with respect to the second component. In some such embodiments, it is exactly six distinct points on the kinematic interface that receive a load to maintain a stationary configuration of the printed component with respect to the second component.

The method can also include using the kinematic interface(s) to locate the printed component at a desired location with respect to a tool or machine. In such embodiments, the method can also include performing one or more post-processing actions using the tool or machine. The one or more post-processing actions can include removing at least one feature of the kinematic interface(s), for instance after the feature(s) has been used for precision location purposes and is no longer needed. Alternatively, or additionally, the one or more post-processing actions can include removing material from the printed component that is not the one or more kinematic interfaces to arrive at a desired final configuration of the printed component. Non-limiting examples of such post-processing actions can include turning through use of a lathe and milling, among others known to those skilled in the art or otherwise derivable from the present disclosures.

At least one feature of the one or more kinematic interfaces can be a quasi-kinematic or elastically-averaged interface. Alternatively, or additionally, at least one feature of the one or more kinematic interfaces can be at least one of a portion of a spherical surface and a v-shaped groove. Spherical surfaces can include hemispheres and canoe balls. Further, other types of kinematic features that can be used include a variety of protruding structures besides spherical structures (e.g., a cone and a pyramid shape, among others) and a variety of formations that are made in the surface besides v-shaped grooves (e.g., square grooves, hemispherical depressions, and conical depressions, among others).

The types of additive manufacturing that can be used in conjunction with the provided methods include, but are not limited to, extrusion, fused filament fabrication, stereolithography, binder jetting, material jetting, selective laser melting, electron beam melting, and powder bed fusion.

The formulation of the print plan based on the three-dimensional model of the component can further include identifying a location on the at least one planned surface at which the kinematic interface(s) is to be printed based on at least one of a desired coupling stiffness of the kinematic feature(s), one or more forces to be applied to the kinematic feature(s), and a desired maximum deflection for the kinematic feature(s).

One exemplary embodiment a system for manufacturing a three-dimensional object includes an additive manufacturing printer, a load supplier, and a post-processing tool or machine. The additive manufacturing printer is configured to fabricate a component having at least one kinematic interface (KI) associated with a surface of the component. The load supplier is configured to apply load to the at least one KI to preload the at least one KI. The post-processing machine includes at least one complementary KI that is complementary to the at least one KI associated with the surface of the component. The at least one complementary KI can be part of the machine itself, or it can be disposed on another object or fixture that is positioned at a particular location with respect to the machine. A desired location of the component with respect to the machine is achieved when the at least one KI is fixedly engaged with the at least one complementary KI. The post-processing machine is configured to perform one or more post-processing actions on the component when the component is disposed at the desired location.

In some embodiments, the at least one complementary KI can be fixtured to the post-processing machine. The additive manufacturing printer can be one of a selective laser sintering/melting (SLM) printer and an electron beam melting (EBM) printer, either of which can be configured to fabricate the component from a metal. Other types of additive manufacturing printers can also be used instead of, or in addition to, SLM and EBM printers, including but not limited to fused filament fabrication printers, stereolithography printers, binder jet printers, material jet printers, and powder bed fusion printers, among others.

The load supplier can be any device, object, or the like that is able to apply a force to the KI(s), including but not limited to various actuators and fasteners. For example, the load supplier can be one or more threaded fasteners that are able to apply a force to the KI(s). In some embodiments, at least one force measurement device (e.g., a load cell, strain gauge, etc.) can be provided to measure the load applied by the load supplier, which in turn can be used to determine when a desired preload for the KI(s) is achieved. The load supplier can be configured to impart a predetermined load on the KI(s) over a period of time such that the KI(s) plastically deforms. The load supplier can include a contact surface that can be configured to receive the KI(s) and change at least one of a shape and a surface texture of the KI(s). The system can further include both a load cell and a controller. The load cell can be configured to measure an amount of force supplied by the load supplier, and the controller can be configured to receive measurements from the load cell and make changes to operation of the post-processing machine or load supplier based on the received measurements. In some embodiments, the system can include a heating element that can be configured to heat the contact surface of the load supplier to cause at least a portion of the KI(s) to be more readily able to change at least one of a shape and a surface texture of the at least one kinematic interfaces.

In one exemplary method for printing a three-dimensional object, the method includes providing a three-dimensional model of a component to be printed by an additive manufacturing printer and specifying both at least one surface of the component to be printed onto which one or more kinematic interfaces (KIs) are to be printed and at least one parameter that impacts a preferred location of the KI(s) on the specified surface(s). The at least one parameter is selected from at least one of a desired coupling stiffness of the KI(s), one or more forces to be applied to the planned KI(s), and a desired maximum deflection for the KI(s). A controller is configured to determine the preferred location based on the specified surface(s) of the component and the specified parameter(s). The method additionally includes instructing the additive manufacturing printer to print the component such that the KI(s) are disposed on the specified surface(s) at the preferred location.

In some embodiments, instructing the additive manufacturing printer to print can additionally include deforming KI(s) by applying a determined amount of load to the KI(s). In some such instances, the controller can be configured to determine the determined amount of load based on the specified parameter(s). In addition, or alternatively, instructing the additive manufacturing printer to print can include reforming the KI(s) by directing it (them) against a contact surface to change at least one of a shape and a surface texture of the KI(s). In some such instances, the controller can be configured to determine which and how much to change of the at least one of the shape and the surface texture of the KI(s) based on the specified at least one parameter.

The method can further include positioning the printed component with respect to a post-processing tool or machine by forming a kinematic coupling (KC) between the KI(s) of the printed component and one or more complementary KIs associated with the post-processing tool, and instructing the post-processing tool to modify the printed component. In some such embodiments, a kinematic interface of the one or more KIs and a complementary KI of the one or more complementary KIs are configured such that at least six distinct points on the KI receive a load to maintain a stationary configuration of the printed component with respect to the post-processing tool. In some such embodiments, it is exactly six distinct points on the kinematic interface that receive a load to maintain a stationary configuration of the printed component with respect to the post-processing tool.

The post-processing tool can be instructed to modify the printed component. For example, the post-processing tool can be operated to remove at least one feature of the KI(s). By way of further example, the post-processing tool can be operated to remove material from the printed component that is not the one or more kinematic interfaces to arrive at a desired final configuration of the printed component. Non-limiting examples of such post-processing tool operation can include turning through use of a lathe and milling, among others known to those skilled in the art or otherwise derivable from the present disclosures.

In some embodiments, at least one feature of the KI(s) can be a quasi-kinematic or elastically-averaged interface. Alternatively, or additionally, at least one feature of the one or more kinematic interfaces can be at least one of a portion of a spherical surface and a v-shaped groove. Spherical surfaces can include hemispheres and canoe balls. Further, other types of kinematic features that can be used include a variety of protruding structures besides spherical structures (e.g., a cone and a pyramid shape, among others) and a variety of formations that are made in the surface besides v-shaped grooves (e.g., square grooves, hemispherical depressions, and conical depressions, among others).

Additive manufacturing techniques that can be used to print the component include, but are not limited to, SLM, EBM, FDM®, stereolithography, binder jetting, and selective laser melting.

BRIEF DESCRIPTION OF DRAWINGS

This disclosure will be more fully understood from the following detailed description taken in conjunction with the accompanying drawings, in which:

FIG. 13B is a schematic side view of another exemplary embodiment of an AM printed component having a kinematic interface formed on a bottom surface thereof, the kinematic interface being engaged with a complementary kinematic interface formed in a top surface of a plate associated with a mill to form a kinematic coupling, the mill including a shaping tool proximate to a second surface of the AM printed component, the AM printed component being an octahedral component;

FIG. 13C is a schematic side view of another exemplary embodiment of an AM printed component, the component being disposed on a build plate having a kinematic interface formed on a bottom surface thereof;

FIG. 15 is a schematic flowchart of one exemplary embodiment of a workflow for forming additive manufacturing assemblies;

DETAILED DESCRIPTION

Figure 1A:
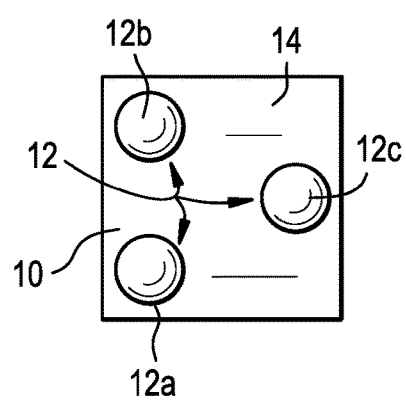
FIG. 1A is a bottom view of one exemplary embodiment of a first AM printed component, the first AM printed component including a kinematic interface formed on a bottom surface thereof.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, to the extent features, sides, or steps are described as being "first" or "second," such numerical ordering is generally arbitrary, and thus such numbering can be interchangeable. Still further, in the present disclosure, like-numbered components of various embodiments generally have similar features when those components are of a similar nature and/or serve a similar purpose. Additionally, in a number of instances, various terms are used interchangeably, including, by way of non-limiting example, terms like "component" or "part."

It will be appreciated that, for convenience and clarity, spatial terms such as "top," "bottom," "up," and "down," among others, may be used herein with respect to the drawings. However, these systems can be set-up using various orientations and positions, and these terms are not intended to be limiting and/or absolute. To the extent spatial terms are used to describe surfaces and the like in lieu of numerical identifiers (e.g., a "first surface," a "second surface," etc.), numerical identifiers can be used. Thus, sometimes a "top surface" or a "bottom surface" may be referred to as any of a "first surface," a "second surface," and the like. To the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. To the extent the present disclosure includes some illustrations and descriptions that include prototypes or bench models, a person skilled in the art will recognize how to rely upon the present disclosure to integrate the techniques, systems, devices, and methods provided for into a product in view of the present disclosures.

The present disclosure contains references to "kinematic couplings" or "KCs," and one or more such KCs are provided for in conjunction with the disclosed systems, devices, and methods. A person skilled in the art, particularly in light of the present disclosure, will generally understand what a kinematic coupling is, how it works, what its purpose is, and the various types of kinematic couplings that can be used in conjunction with the systems, devices, and methods provided for herein. As used herein, the term "kinematic coupling" provides for a combination of surfaces (often spherical and planar) between at least two parts or components that constrain all six degrees of relative motion between such parts/components. This generally results from near-ideal point contacts at six locations between the parts/components. A person skill in the art will understand that while a near-ideal contact results at six "points," in a real-world application a "point" can include a finite area of contact. When two components are involved in forming a KC, each component includes a "kinematic interface" or "KI," and each KI can include one or more "kinematic features," often referred to herein as "features." Many combinations and placements of geometric features such as hemispheres, cones, pyramid-shapes, canoe balls, v-shaped grooves, square grooves, hemispherical depressions, conical depressions, etc. on a component can be understood to be a KI, with the geometric features being considered features of the KI. Features can include structures that protrude from a surface (e.g., hemispheres, canoe balls, cones, and pyramid-shapes, among others derivable from the present disclosures based on the knowledge of a person skilled in the art, with those having spherical surfaces including hemispheres and canoe balls, among others) and formations within a surface such that a portion of the formation is disposed below the surface (e.g., v-shaped grooves, square grooves, hemispherical depressions, conical depressions, among others derivable from the present disclosures based on the knowledge of a person skilled in the art). More generally, as described herein, a "feature" is a sub-part of a "kinematic interface," which is a sub-part of a "kinematic coupling." As described in further detail below, often a KI can include three features (e.g., three hemispheres on one component and three v-grooves on a second component), and the KI of each of the two components can engage to form a KC and constrain all six degrees of relative motion between the two components.

Further, the present disclosure is inclusive of all types of KCs, including but not limited to quasi-kinematic couplings ("QKCs") and elastically-averaged interfaces. QKCs are a sub-class of KCs that trade controlled overconstraint between two components for increased load carrying capacity or reduced cost of fabrication. Examples include a KI having three spherical surfaces on one component that mate with a KI having three cone-shaped, axisymmetric grooves on a second component or other object/surface(s). In such instances, the contact points between the two components/objects may not be point contacts, but can be, for example with respect to the spherical surfaces and cone-shaped axisymmetric grooves, circular regions of line contact. When loaded, such geometry features can have much higher contact area than point contacts, and deformation that can occur as a result of most couplings not being ideal, meaning deformation of a bulk structure of the components can occur as the coupling is loaded to alleviate the overconstraint. In other embodiments, plane-to-plane contact can result from the use of QKCs. For example, two components can be located using six planar contacts of comparably low surface area to create a coupling with high rigidity. Accordingly, as described herein or otherwise known to those skilled in the art in view of such descriptions, QKCs can be a collection of geometric features distributed across two components (or combination of components, objects, and surface(s)) that: (1) achieve a combination of point, line, and plane contact sufficient to overconstrain the components in at least one degreed of freedom; (2) show evidence of a balance between contact pressure and overconstraint, especially in the sizing of planar contact areas; and (3) achieve ideal constrain of all remaining degrees of freedom, if any. Other non-limiting configurations of QKCs include interfaces that make plane-plane contact over contact patches sized just large enough to achieve a required stiffness with minimal overconstraint.

In general, an elastically averaged interface is a mechanical contact in which multiple instances of an elastic (compliant) feature overconstrain the relative position of two components when mated (i.e., the number of contact points exceeds the degrees of freedom). Some non-limiting examples of elastically averaged interfaces include protrusions, posts, and sidewalls of a component. A commonly known item that includes elastically averaged interfaces are LEGO® blocks, more generically referred to as modular blocks. The elastically averaged interfaces of LEGO® blocks include their protrusions (typically disposed on a top side of the block), their posts (typically disposed on an underside of the block, extending downward from the surface on which the protrusions are formed), and the sidewalls of the block itself. These features have the effect of averaging out irregularity in the conformity of the contact points and so this averaging improves the accuracy and repeatability of the contact with a greater effect with more contact points. One example of an elastically averaged coupling can include a first component having a protrusion and a second component that includes a mating interface. The protrusion of the first component and the mating interface on the second component can be on opposing faces. Other shapes that can enable elastically averaged contacts are additionally contemplated. For example, a linear extruded structure with a periodic rectangular, triangular, or rounded profile can mate with an independently selected linear extruded structure with a periodic profile, or a threaded screw can mate with a threaded hole. Further information related to elastically averaged interfaces is provided in U.S. patent application Ser. No. 15/475,119, entitled "Systems, Devices, and Methods for Microfluidics using Modular Blocks," filed Mar. 30, 2017, the contents of which is incorporated by reference herein in its entirety.

Still further, the present disclosure primarily focuses on additive manufacturing (AM), although the described systems, devices, and methods can be adapted for other types of printing, including other types of three-dimensional (3D) printing. Likewise, the type of AM with which the present systems, and devices can be used is no way limiting. To the extent any of the provided embodiments makes references to one type of AM technique, a person skilled in the art, in view of the present disclosures, could adapt various types of AM to be used in conjunction with the present disclosures without departing from the spirit of the present disclosure. Accordingly, to the extent the present disclosure describes depositing materials for printing via fused filament fabrication, e.g. Fused Deposition Modeling (FDM®), a person skilled in the art will recognize that the same techniques can be applied to other techniques for depositing materials during 3D printing, including extrusion, stereolithographic, selective laser sintering/melting, electron beam melting, binder jetting, material jetting, powder bed fusion, and other known additive manufacturing methods.

The present disclosure generally relates to methods, systems, and devices for precisely locating additively manufactured components for assembly and/or post processing manufacturing, and it provides for a number of different advances in additively manufactured assemblies. More particularly, when a component, or a portion thereof, is 3D printed, the resulting print output includes one or more KIs that are complementary to one or more KIs on another component, part, object, etc. The other component, part, object, etc. may or may not also be 3D printed. The combination of the KIs of the two components (or parts, portions, objects, etc.) results in a KC formed between the two components, and thus provides for precise locating. As discussed in greater detail below, such configurations can serve a variety of purposes or functions, including by not limited to forming a KC to precisely locate the object having a KI that is part of the KC with respect to a post-processing tool that is associated with the complementary KI that is part of the KC and/or forming a KC to precisely locate the object having a KI that is part of the KC with respect to a second object having the complementary KI that is part of the KC to precisely locate the two objects with respect to each other to form an assembly therebetween.

As will be made more clear by the description of the non-limiting exemplary embodiments provided for below, and illustrated in the accompanying figures, the fabrication of KIs on one or more surfaces on one or more parts can provide a number of benefits. For example, they allow for more accurate placement of the component having the 3D-fabricated KI(s) with respect to another object or component, such as a post-processing tool and/or another component to which the first component is coupled to form an assembly (or part of a bigger assembly). The formation of the KC(s) using the KIs provides for precise and repeatable placement. This results, for example, in allowing more 3D-printed objects to have a wider industrial applicability because it eases previously existing difficulties when trying to manufacture more complex components and geometries using techniques such as AM and/or any manufacturing or assembly technique where allowing for more precise locating can enhance the ease, strength, or overall performance of the components with which the techniques are being used. Additionally, the use of KC(s) using integrated KIs on both components and on post-processing tools can allow for standard, or reconfigurable, fixturing tools to locate various AM components for post-processing with the various post-processing machines or tools.

The present disclosure also provides for design processes of an AM component, where a user can create computer models of the assembly, or component(s), that utilizes KIs and KCs by only providing a limited amount of information. Such a computer model of the component(s) may be initially designed to not include any KIs or associated features. For example, a user may download a pre-existing model of a component which traditionally is created using prior AM processes, or utilize any other technique known to those skilled in the art for generating or otherwise obtaining a 3D-model for AM printing. The user can then enter one or more parameters (e.g., a desired surface(s) onto which a KI(s) is to be formed, the type of feature(s) of the KI(s) to be included, performance characteristics of the KI(s), etc.), and the associated system can determine an ideal location of the feature so the KI(s). The system can then print the component, including the KI(s) at the determined ideal location(s).

Kinematic Features, Interfaces, and Couplings

To help lay an understanding of how the disclosed systems and methods can be used to design, use, and manufacture KIs for KCs, it can be helpful to first discuss various types of KCs. The particular types of KCs can be chosen to provide desired constraints between the component and a fixture (e.g., object, surface, etc.), or between the component and another component. In general, a KC can include two KIs that can be coupled together. The KIs can, for example, each include three kinematic features disposed on the respective component that are configured to interface with corresponding kinematic features on a second component, object, or the like.

Figure 1B:
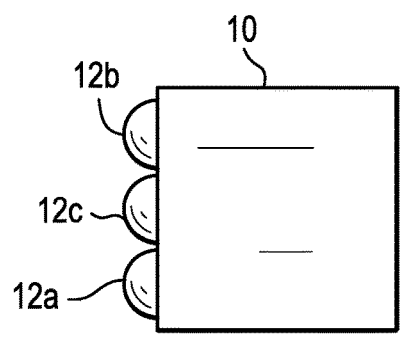
FIG. 1B is a side view of the first AM printed component of FIG. 1A.
Figure 1C:
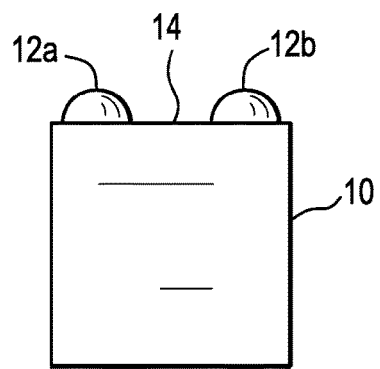
FIG. 1C is a front view of the first AM printed component of FIG. 1A.

FIGS. 1A-1C illustrate one exemplary embodiment of a component 10 printed using AM processes. The component 10 includes a KI 12 formed on its bottom surface 14. As shown, the KI 12 includes three hemispheres 12a, 12b, and 12c, which are the kinematic features, or "features," of the KI 12. The KI 12 can be configured to be complementary to kinematic features of a second component, fixture, object, structure, surface, or the like. In the illustrated embodiment, the three hemispheres 12a, 12b, and 12c generally form a substantially equilateral triangle on the bottom surface 14, although other configurations are possible. The configuration of the hemispheres 12a, 12b, and 12c, and of any KI provided for herein, can depend on a variety of factors, including but not limited to the size and shape of a KI(s) with which the KI(s) is intended to be used, the desired configuration of the components or the like being engaged together to form a KC, the desired load distribution, and other parameters and preferences of the user and the materials being used.

Figure 2A:
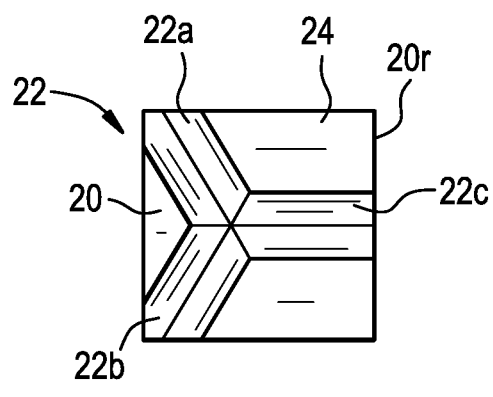
FIG. 2A is a top view of one exemplary embodiment of a second AM printed component, the second AM printed component including a complementary kinematic interface formed in a top surface thereof, the complementary kinematic interface being complementary to the kinematic interface of FIGS. 1A-1C such that a kinematic coupling can be formed between the first and second AM printed components.
Figure 2B:
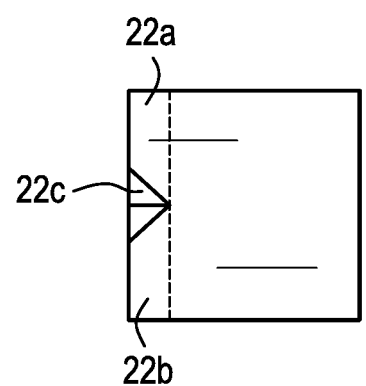
FIG. 2B is a side view of the second AM printed component of FIG. 2A.
Figure 2C:
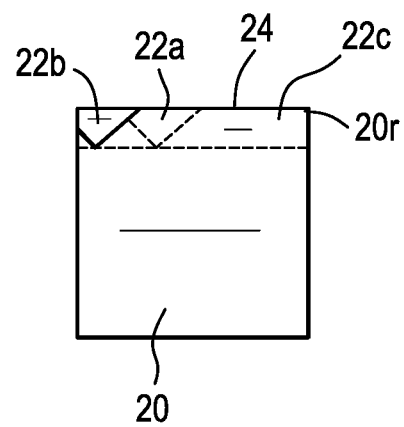
FIG. 2C is a front view of the second AM printed component of FIG. 2A.

By way of non-limiting example, FIGS. 2A-2C illustrate one exemplary embodiment of a second component 20 that includes complementary kinematic features to those features of the component 10 of FIGS. 1A-1C. The component 20 includes a KI 22 formed on its top surface 24. As shown, the KI 22 includes three v-shaped grooves 22a, 22b, and 22c, which are the kinematic features of the KI 22, disposed substantially equilaterally around the surface 24. The grooves 22a, 22b, and 22c extend to an outer rim 20r of the component 20, although they do not have to do so. Further, while the V-shaped grooves 22a, 22b, and 22c converge at a single location at an approximate center of the surface 24, other configurations, including those in which one or more of the grooves 22a, 22b, and 22c do not intersect, can be provided. The second component 20 can likewise be produced by AM, although it can also be formed using any other fabrication method known to those skilled in the art, including non-3D printed based methods for forming a structure. Technically the first component 10 can also be printed using non-3D printed based methods, but generally at least one of the two components 10, 20 is printed using a 3D printing based method such as AM, and sometimes both are printed in such a manner. This holds true for each of the embodiments provided for in the present disclosure.

Figure 3:
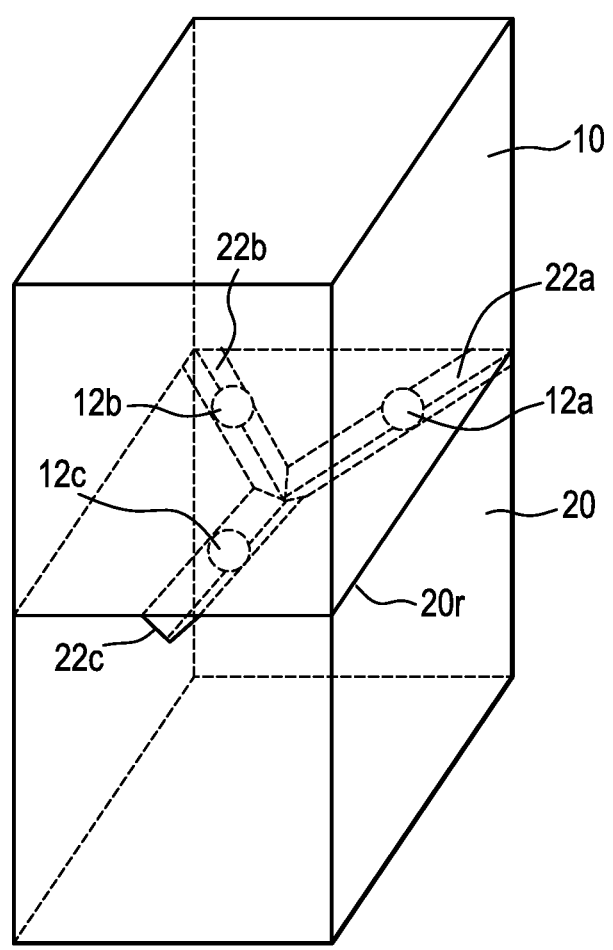
FIG. 3 is a perspective view of the first AM printed component of FIG. 1A engaged with the second AM printed component of FIG. 2A to form a kinematic coupling therebetween.

FIG. 3 illustrates the first and second components 10 and 20 engaged together to form a KC. In some formations, two points on the surface of each hemisphere 12a, 12b, and 12c engage two points on the surface of each groove 22a, 22b, and 22c, resulting in six distinct points on each KI 12, 22 receiving a load to maintain a stationary configuration with respect to each other. In some instances, additional points on one or more of the hemispheres 12a, 12b, and 12c and one or more grooves 22a, 22b, and 22c may contact while still maintaining a stationary configuration with respect to each other. For example, various treatments (described below) can be performed to one or more of the features to modify the character of the surface contact between the components. Further, although engagement locations are illustrated and described as points, in other configurations provided for or otherwise derivable from the present disclosure, contact points between KIs of different components can be regions of line contact and/or other line and plane contacts.

Figure 4:
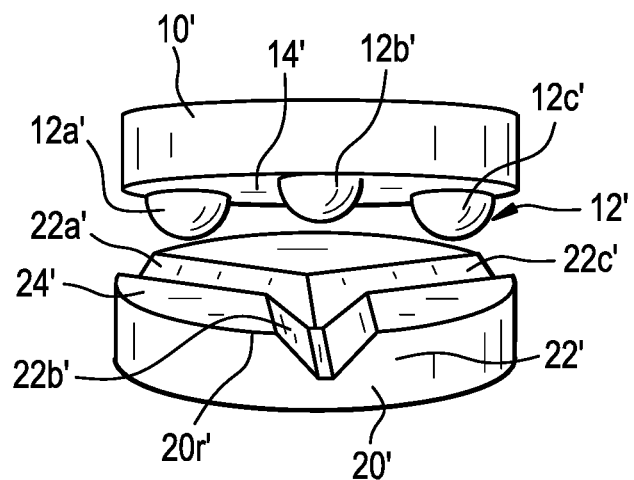
FIG. 4 is a perspective view of one exemplary embodiment of two components each having a kinematic interface for forming a kinematic coupling.
Figure 5:
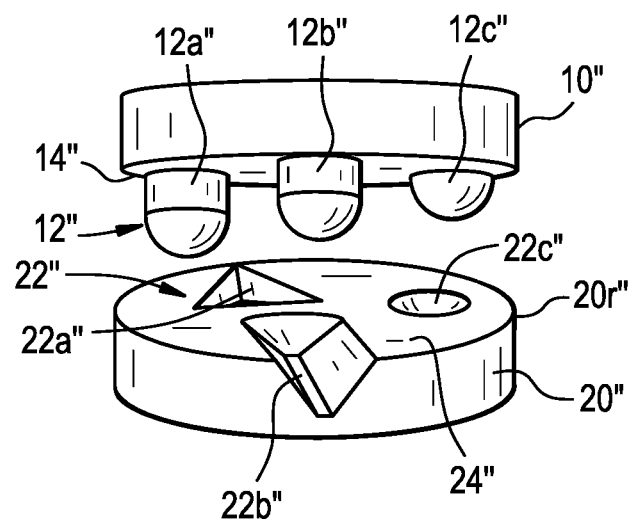
FIG. 5 is a perspective view of another exemplary embodiment of two components each having a kinematic interface for forming a kinematic coupling.

FIGS. 4 and 5 illustrate additional configurations of components that form KCs. FIG. 4 provides for a first component 10' having a bottom surface 14' with a KI 12' that includes three hemispheres 12a', 12b', and 12c' that are substantially similar in size and shape and generally form a substantially equilateral triangle on the bottom surface 14'. FIG. 4 also provides a second component 20' having a top surface 24' with a KI 22' that includes three v-shaped grooves 22a', 22b', and 22c' that are substantially similar in size and shape, are disposed substantially equilaterally around the surface 24', and converge at a single location at an approximate center of the surface 24'. Further, the grooves 22a', 22b', and 22c' extend to an outer rim 20r' of the component 20, although they do not have to do so. The components 10' and 20' form a KC in a manner similar to as described above with respect to the components 10 and 20 of FIG. 3.

FIG. 5 illustrates an alternative configuration for a first component 10" and a second component 20" that form a KC therebetween. As shown, a bottom surface 14" of the first component 10" includes a KI 12" that includes three hemispheres 12a", 12b", and 12c". Unlike the two previous embodiments, the hemispheres 12a", 12b", and 12c" are not substantially similar in size and shape. The depiction in FIG. 5 demonstrates that features of KIs can be different in the same interface. As shown, two of the features, hemispheres 12a" and 12b", include a cylindrical portion extending from the surface 14" and then a hemispherical portion, while the hemisphere 12c" includes only a hemispherical portion. The hemispheres 12a", 12b", and 12c" are disposed substantially equidistantly around the surface 14" such that they can be described as forming a substantially equilateral triangle on the surface 14".

Likewise, the second component 20" also includes differently formatted KIs 22", as shown grooves 22a", 22b", and 22c", disposed on a top surface 24" of the component 20". The groove 22a" has a shape that is substantially shaped like an equilateral triangle for receiving the hemisphere 12a", the groove 22b" has a shape that is substantially shaped like a v-shaped groove for receiving the hemisphere 12b", and the groove 22c" has a shape that is substantially circular for receiving the hemisphere 12c". The groove 22c" extends to an outer rim 20r" of the component 20", although it does not have to do so. Unlike the two previous embodiments, the grooves 22a", 22b", and 22c" do not converge at a single location. They are, however, disposed in a manner in which approximate centers of each of the grooves 22a", 22b", and 22" are disposed substantially equidistantly around the surface 24" such that the grooves 22a", 22b", and 22" can be described as forming a substantially equilateral triangle on the surface 24".

While FIG. 5 helps illustrate alternative configurations for kinematic features, KIs, and KCs, a person skilled in the art, in view of the present disclosures, will recognize that any combination of geometric formations that can be made to meet at one or more points (or at more than a point, i.e., not point contacts, as provided for herein, e.g., circular regions of line contact, plane-to-plane, etc.) may be suitable geometries for forming KCs. The size, shape, and configuration of the features and KIs, and thus the resulting KCs, can be any conceivable size, shape, and configuration without departing from the spirit of the present disclosure. Accordingly, the illustrated embodiments of kinematic features, KIs, and KCs are by no means limiting of the possible kinematic configurations that can be incorporated into components that are printed 3D. Nevertheless, some additional, non-limiting examples of possible kinematic features, KIs, and KCs are provided below.

For example, the hemispherical kinematic features provided above can be in contact with plane, cylindrical, and other hemispherical kinematic features. In a further alternative, two cylindrical kinematic features can be made to have a single point of contact provided their axes are not parallel. Other geometries of kinematic features with a point like corner, such as cones and pyramids, can be used in place of hemispheres as well. The geometric forms of the kinematic features 12a, 12b, 12c and 22a, 22b, and 22c illustrated in FIGS. 1A-3 can provide lower contact pressure once coupled together and can provide improved stiffness and placement can be chosen for simplicity. Moreover, mitigation of contact pressure can be achieved through the use of KIs including hemispheres that are to be disposed in KIs that include v-shaped grooves, as shown in FIGS. 1A-3. Because the components as illustrated in FIGS. 1A-3 are engaged by six discrete points, no over constraint will occur. In an optimal physical implementation, where the effects of friction, viscoplasticity, deformation, and other such properties can be carefully controlled, KCs are capable of repeatability below about 100 nanometers, which is to say that the placement of the component including a KI with respect to the object having a complementary KI is the same within about 100 nanometers or less. Such placement is described in greater detail below. However, depending on the type of material and process used to fabricate an AM part, at least some deformation can affect the repeatability of placement and substantially reduce the performance, as compared to the optimal physical implementation. As discussed below, the present disclosure contemplates such issues and discloses the use of techniques (e.g., a break-in or reformation procedure) to mitigate real-world applications that result in performance outside of the anticipated limits.

Figure 6A:
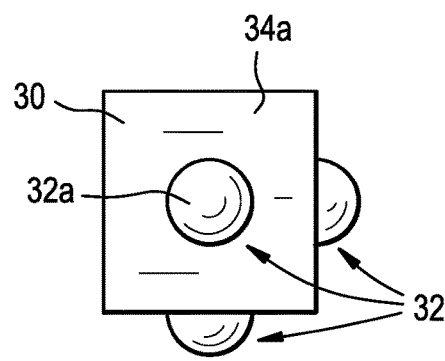
FIG. 6A is a bottom view of another exemplary embodiment of a first AM printed component, the first AM printed component including a kinematic interface formed on multiple surfaces thereof.
Figure 6B:
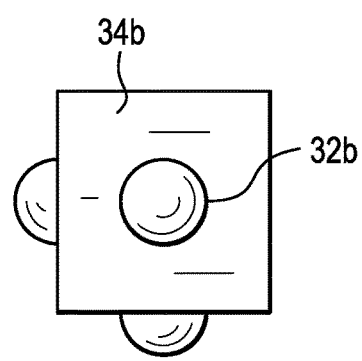
FIG. 6B is a side view of the first AM printed component of FIG. 6A.
Figure 6C:
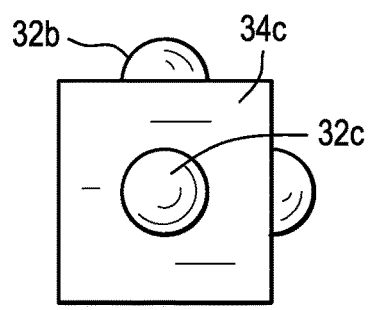
FIG. 6C is a front view of the first AM printed component of FIG. 6A.

In each of the above-described embodiments, the KI was formed on a single surface. However, in alternative embodiments, the KI can be formed on multiple surfaces. FIGS. 6A-6C illustrate one exemplary embodiment of a component 30 in which kinematic features, as shown hemispheres 32a, 32b, and 32c, and collectively, the KI 32, are each respectively disposed on a separate surface or face 34a, 34b, and 34c of the component 30. In the illustrated embodiment the hemispheres 32a, 32b, and 32c are disposed centrally on the respective faces 34a, 34b, and 34c, although a person skilled in the art will recognize that other locations for the kinematic features with respect to the surfaces of the component 30 are possible.

Figure 7:
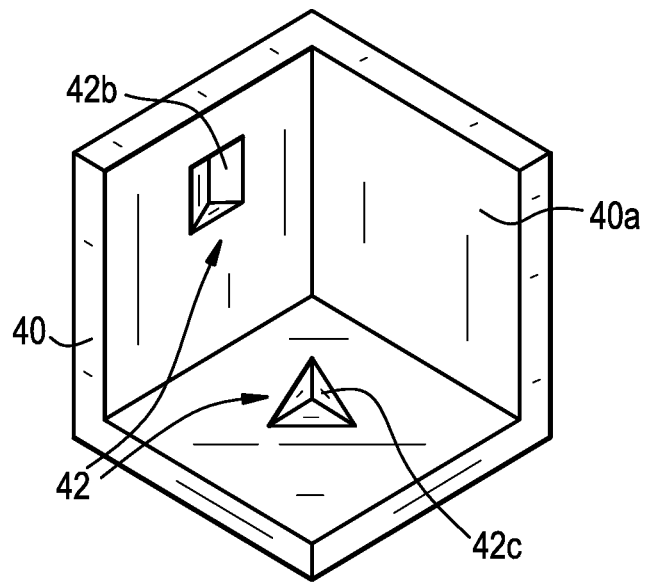
FIG. 7 is a perspective view of another exemplary embodiment of a second AM printed, the second AM printed component including a complementary kinematic interface formed in multiple surfaces thereof, the complementary kinematic interface being complementary to the kinematic interface of FIGS. 6A-6C such that a kinematic coupling can be formed between the first and second AM printed components.
Figure 8:
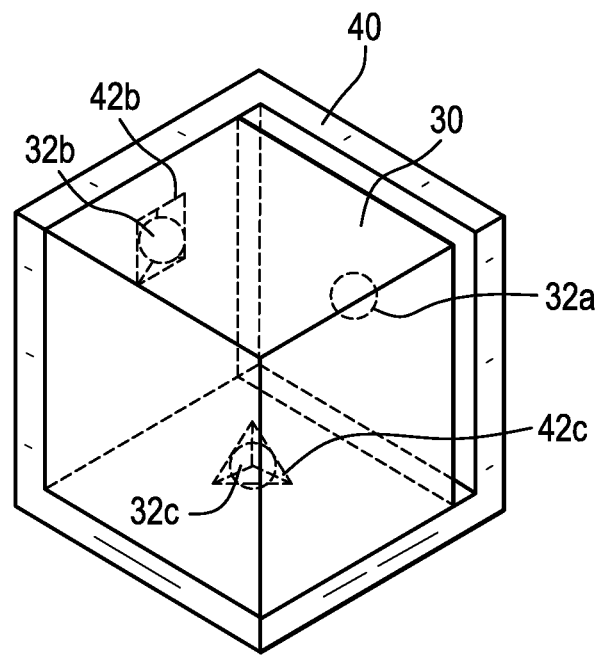
FIG. 8 is a perspective view of the first AM printed component of FIG. 6A engaged with the second AM printed component of FIG. 7 to form a kinematic coupling therebetween.

FIG. 7 illustrates one exemplary embodiment of a second component 40 that includes complementary kinematic features to those features of the component 30 of FIGS. 6A-6C. As shown, the second component 40 includes a KI 42 that includes two grooves 42a and 42c that are complementary to the hemispheres 32a and 32c. The groove 42a has a substantially square prism shape such that surfaces of the groove 42a engage the hemisphere 32a at two points when they form a KC, and the groove 42c has a substantially pyramidal shape such that surfaces of the groove 42c engage the hemisphere 32c at three points when the form a KC. The sixth point to form the KC is provided by the hemisphere 32b engaging a face 40a at a single point. An exemplary illustration of the KC formed by the components 30 and 40 is provided in FIG. 8, with the hemisphere 32a being engaged by the grove 42a, the hemisphere 32c being engaged by the groove 42c, and the hemisphere 32b being engaged by the face 40a. In some embodiments, an additional hemisphere can be provided on a face of the component 30 that is not adjacent to a face of the second component 40. In such embodiments, the additional hemisphere can be used to engage with another component, object, surface, or the like.

Treatment of Kinematic Interfaces

Including KIs on a printed component affords a number of benefits, but their inclusion as part of an AM printed component can be further enhanced by performing additional treatments on the interfaces themselves. In particular, two types of treatments are provided for that allow for improved locating performance of a kinematic coupling. The treatments can be provided in anticipation of possible applications of force during use. As a result of the provided for treatments, KIs on AM components can be used with greater accuracy and consistency over a longer period of time by reducing deformation during use and/or improving the quality of the mating surfaces.

In one instance of pretreating a KI prior to using it, kinematic features subject to loads during kinematic coupling can be subject to deformation as a result of loading that occurs at the load points (or line contacts, planes, etc.). More particularly, the force that is applied to a KI of a first component when the KI engages a KI of a second component (or object, structure, fixture, surface, etc.) can cause one or more of the features to deform. The deformation of the feature(s) can be unpredictable, which, in turn, can lower the ability for the KI to be subsequently used while achieving substantially equal and accurate results because precision is reduced by the change in shape and/or configuration of the kinematic feature(s).

Figure 9A:
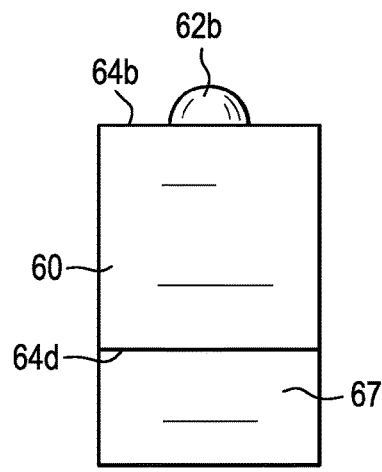
FIG. 9A is a side view of another exemplary embodiment of an AM printed component having a kinematic feature formed on a bottom surface thereof.
Figure 9B:
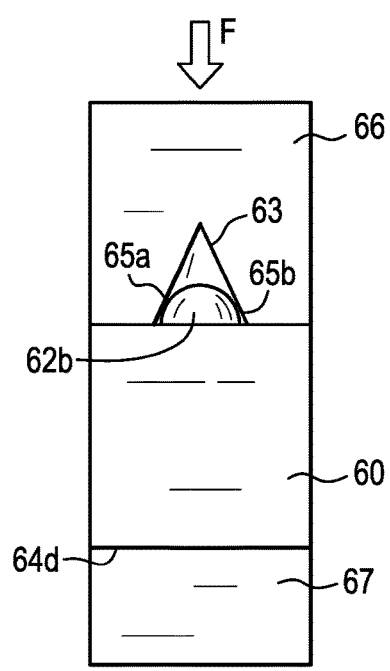
FIG. 9B is a side view of the AM printed component of FIG. 9A with the kinematic coupling being engaged by one exemplary embodiment of a load supplier such that the load supplier applies load to the kinematic feature to deform the kinematic feature.
Figure 9C:
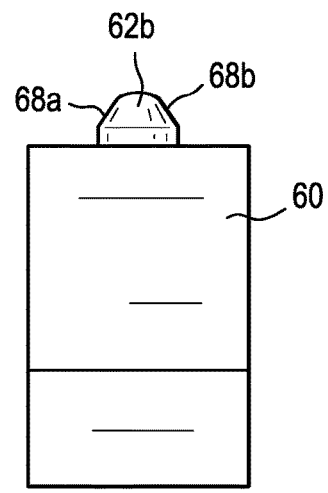
FIG. 9C is a side view of the AM printed component of FIG. 9B after the load supplier has been disengaged from the kinematic feature, the kinematic feature having a deformed configuration as a result of the load applied by the load supplier.

FIGS. 9A-9C illustrate one technique for treating one or more features of a KI to prevent unpredictable deformation of the KI, which in turn causes loss of precision. The process is sometimes referred to as breaking-in or purposeful deformation process. More particularly, the figures illustrate a break-in process by which a kinematic feature, as shown a hemisphere 62b, of a first component 60 is treated to limit or eliminate deformation effects that may occur when a load is applied to the hemisphere 62. FIG. 9A illustrates the component 60 and the kinematic feature 62b formed on its bottom surface 64b. Although not shown, other kinematic features can be provided on the surface 64b, or other surfaces of the component 60, the kinematic feature(s) forming a KI.

As shown in FIG. 9B, a load supplier or force applicator 66 may be brought into contact with the kinematic feature 62b, and as shown the bottom surface 64b, although the load supplier 66 does not have to engage the surface 64b, to apply a load to the feature 62b. More particularly, a force in a direction F is applied to advance the load supplier 66 towards the bottom surface 64b, causing a v-shaped groove 63 formed in the load supplier 66 to engage the kinematic feature 62b at contact points 65a and 65b. The load supplier 66 is thus providing a prescribed load to the kinematic feature 62b to cause it plastically deform in the break-in process. The amount of load applied can be measured using any number of techniques, including but not limited to operating a measurement device, as shown a load cell 67 disposed at a surface 64d of the component 60 that is opposed to the surface 64b to measure the amount of force supplied by the load supplier 66 to the component 60. Strain gauges and displacement sensors can also be used as a measuring device, among other known measuring devices. A controller, which is described in greater detail below with respect to FIGS. 16A-16C, can be in communication with the load cell (or other measurement device(s)) so the controller can receive measurements from the load cell and make changes to at least one of a print plan and the operation of the post-processing tool based on the received measurements. For example, such a system can determine the degree of elastic and plastic deformation that a coupling has undergone from the force measurement and a force-deflection curve using techniques known to those skilled in the art. Either the load supplier 66 reacts to the measurement to cause a desired displacement, or a coordinate transform is computed using the measured data that relates the coordinate system of a permanent fixture (e.g., the component 60) to the AM geometry undergoing post-processing. The compliance of the couplings, and the devices used to perform such compliance, result in an improved system. The controller can be part of the AM printer, or alternatively, it can be part of a separate component or architecture and communicate with the AM printer. For example, the controller can be software that is integrated in a CAD or CAM package that communicates with the printer.

The force supplied by the load supplier 66 in the direction F can be supplied in any number of manners, including in a cyclic manner to provide repetitive loading at a desired amount of force, for example a worst-case value, is achieved. The worst-case value is the most extreme force a component 60 is reasonably expected to experience. The kinematic feature 62b may be expected to undergo further plastic deformation if loaded beyond the worst-case value, but the kinematic feature 62b should resist plastic deformation for operational loads under this value. Further, an amount of the force applied by the load supplier 66 can be most any amount that is able to be applied without breaking the component 60. The amount of force can be stable or it can change throughout the deformation process.

A person skilled in the art will recognize various actuators and other mechanical mechanisms that can operated as a load supplier. In some exemplary embodiments, the load supplier 66 includes threaded fasteners are used as the load supplier. A preload can be applied by controlled application of torque to tightening the fasteners, with the use of a man-in-the-loop or motorized actuator, in response to a force or torque sensitive indicator, or other such devices. The applied torque can serve to stretch the fastener in a spring-like manner across the kinematic coupling, thereby forcing the kinematic interfaces into contact. Pneumatically actuated preloads can be used as the load supplier 66. In such embodiments at least one pneumatic cylinder can push, or pull, two kinematic interfaces into engagement. Pneumatically actuated preloads can benefit from a constant force-displacement characteristic of a pneumatic cylinder driven at a constant pressure, thereby reducing fluctuation in preload as a function of component geometry and component deformation. Still further, in some embodiments, the force F may even be supplied by an outside agent, such as gravity, in lieu of using a load supplier. Further, a person skilled in the art will recognize that a shape and configuration of the groove 63 or other component that contacts the kinematic feature 62b to apply a force thereto can be most any size, shape, and configuration with departing from the spirit of the present disclosure.

Once the prescribed force has been supplied for the desired amount of time, the load supplier 66 can be disengaged from the kinematic feature 62b. FIG. 9C illustrates the resultant configuration of the component 60. More particularly, as shown, the kinematic feature 62b has undergone plastic deformation such that surfaces 68a and 68b have formed on the hemisphere 62b. The surfaces 68a and 68b can be regions of reduced curvature and surface roughness compared with the remainder of hemisphere 62b. The resulting configuration is one that is more stable and stiff, and provides for more repeatable, accurate results since the possible deformation of the feature 62b has already been factored into the resulting component KI. A person skilled in the art will recognize that the break-in process can be performed on other kinematic features of the same or different structures and/or that the load supplier can be configured in a manner such that it engages multiple kinematic features at the same time.

Once a kinematic feature, for example the hemispherical kinematic feature 62b, has been subject to such repetitive loading at worst-case values, there may be insignificant plastic deformation for subsequent loading below the worst-case value. In one exemplary embodiment, the break-in force can be determined with the use of a universal testing machine to record the force-displacement curves of the kinematic feature(s) under the load. With the force-displacement curves, a user can determine the required operating preload to achieve a desired stiffness, for example. The worst-case or break-in force can be a determined by the sum of the preload, additional operational load, and any required safety factor. A break-in force of approximately 133% of the operating preload can, advantageously, provide for precision locating of fused filament fabrication components. Alternatively, the application of a worst-case value can be determined based upon a test component fixture being loaded to failure. Once the load value at failure is determined, a maximal load less than the failure load can be applied. Alternatively, the prescribed worst-case force values can be a function of the geometry of the KI, the material of the component, the required preload, the anticipated dynamic loading, and any required safety factor. Further, the loading process may be instrumented with force-sensitive detectors to ensure that the desired time-force profile has been achieved.

Knowledge of absolute coupling position in use can be determined from a force measurement and a force-deflection curve for the as-treated interface. The force applicator can react to a measured force to cause a desired elastic deformation, thereby deflecting the part into a known location. Force measurement while performing the deformation can help to ensure that the desired degree of plastic deformation occurs. Measuring the force after the KI has been deformed and is seated for use can enable the user to place the component with the KI(s) in a known or desired state of elastic deformation. The force-displacement curve can be measured using, for example, a universal testing machine. Alternatively, a coordinate transform can be computed using the measured data and prior knowledge that relates the particular coordinate system of the permanent fixture relative to the kinematic feature geometry undergoing the break-in process.

Figure 10A:
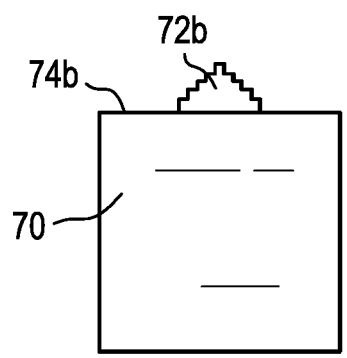
FIG. 10A is a side view of yet another exemplary embodiment of an AM printed component having a kinematic feature formed on a bottom surface thereof.
Figure 10B:
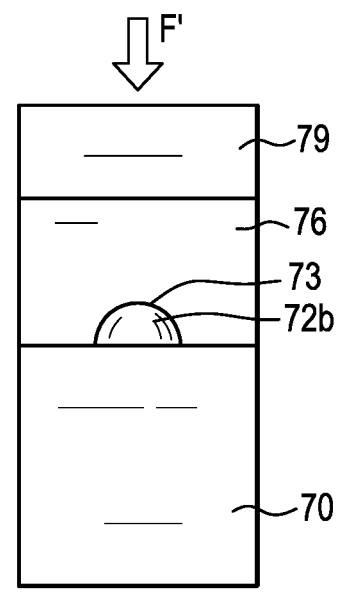
FIG. 10B is a side view of the AM printed component of FIG. 10A with the kinematic feature being engaged by one exemplary embodiment of a mold such that engagement by the kinematic feature with the mold applies a force to the kinematic feature to reform the kinematic coupling.
Figure 10C:
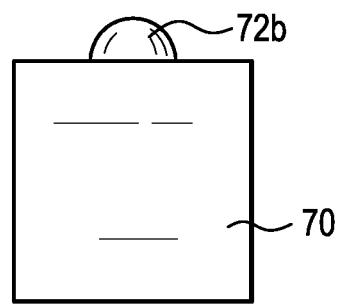
FIG. 10C is a side view of the AM printed component of FIG. 10B after the kinematic feature has been disengaged from the mold, the kinematic feature having a reformed configuration as a result of the force applied by the mold.

Another instance of pretreating a KI of a component prior to using it is illustrated by FIGS. 10A-10C. The illustrated treatment method is designed to remove portions of an AM printed component that may be prone to breakaway during use prior to using the component. Such portions may include brittle portions, or small amounts of material that are not particularly supported by the rest of the structure because the small amounts are excess material deposited during the printing process while printing particular shapes. FIG. 10A illustrates one example of a component 70 having a kinematic feature, as shown a hemisphere 72b, formed on its bottom surface 74b, the hemisphere 72b including excess portions on a peripheral edge thereof. During use, such as during a coupling process to form an assembly or to use in conjunction with a post-processing machine, the excess portions may get scraped away when a load is applied to it. How and when the excess portions get scrapped away, however, is unpredictable. Further, other portions of the component 70 that are supposed to remain as part of the component 70 may get scrapped away with the excess portions. Unpredictable removal of material makes it more difficult to achieve substantially equal and accurate results over time with the same component because precision is reduced by the change in shape and/or configuration of the kinematic feature(s). With respect to FIG. 10A, although not shown, other kinematic features can be provided on the surface 74b, or other surfaces of the component 70, the kinematic feature(s) forming a KI.

As shown in FIG. 10B, a mold or die 76 can be provided to receive the component 70. The mold 76 can include a cavity 73 having a desired configuration for shaping the kinematic feature 72b. The component 70 can be directed towards and into the cavity 73, or the mold 76 can be advanced towards the component 70. In either instance, the mold 76 applies a force to the kinematic feature 72b in a direction F', which in turn can help shape the configuration of the kinematic feature 72b by removing excess portions, or by reshaping them to fill the voids. In some embodiments, a heater 79 can be provided adjacent to the mold 76. The heater 79 can be used to heat the material of the kinematic feature 72b disposed in or adjacent to the mold 76 to help reform the shape of the kinematic feature to be the desired configuration as provided for in the mold 76. Heating the kinematic feature 72b can make the material less resistant to plastic deformation, or otherwise able to be manipulated into desired configurations. In some instances, the material may be considered flowable. More generally, heating the material makes it such that the kinematic feature 72b can have at least one of its shape and its surface texture changed. In other embodiments, the mold 76 itself can have heating capabilities. Not only can the reformation process provide for a desired shape, but it can also provide for a desired surface roughness and/or texture, among other parameters that can be effected, as would be known by a person skilled in the art. Further, other surface features can be created on the surface 74b. For example, in cases where the component 70 is formed from ABS plastic, a hemispherical feature 72 can be pressed against a relatively hard die with spherical pockets to create contact surfaces with low residual surface texture. Optionally, a material can be added between the mold 76 and the component 70. Such a process may be advantageous with thermosetting polymers, for example, where material is simply used to fill the voids between the AM component 70 and the mold 76. The additional material can be chosen for its ability to sustain high contact pressure and/or provide low friction contact. The materials can include, for example polymers, metal, and/or ceramic coatings.

Once the desired shape and configuration of the kinematic feature 72b has been achieved, the mold 76 can be disengaged from the kinematic feature 72b. FIG. 10C illustrates the resultant configuration of the component 70, in which excess portions have been removed and the desired configuration, surface roughness, and/or surface texture have been achieved. The resulting configuration is one that is more stable and stiff, and provides for more repeatable, accurate results since the possible deformation of the feature 72b has already been factored into the resulting component KI. A person skilled in the art will recognize that the reformation process can be performed on other kinematic features of the same or different structures and/or that the mold can be configured in a manner such that it engages multiple kinematic features at the same time. Likewise, the heater can be configured to supply heat to multiple kinematic features at the same time.

Further, the present disclosure provides for both a deformation process and a reformation process to help manage possible changes to a configuration of a KI that may occur during use. These processes can be used as standalone process for treating a component that includes a KI, or they can both be used on the same component that includes a KI.

Assembly of Additively Manufactured Components Having Kinematic Interfaces

As described herein, AM printed components that include KI(s) can be used in various contexts, including to assemble multiple component together, and/or to use in precisely locating the printed component with respect to another object, such as a post-processing tool. This section explores the use of KIs in formulating assemblies, and the section thereafter explores the use of KIs in conjunction with post-processing tools and the like. One skilled in the art will appreciate that the application of the present disclosures can have many advantages in industries where precision is required during manufacturing and during assembly and use of the final product.

At the outset, using KI(s) as provided for herein to form KCs to assemble multiple components together is well understood in view of the already provided disclosures and knowledge of a person skilled in the art. For example, in view of the KCs illustrated in FIGS. 3, 4, 5, and 8, and their related descriptions and illustrations, a person skilled in the art will understand how to form an assembly that includes at least one component that is printed using AM techniques and includes at least one KI.

Figure 11A:
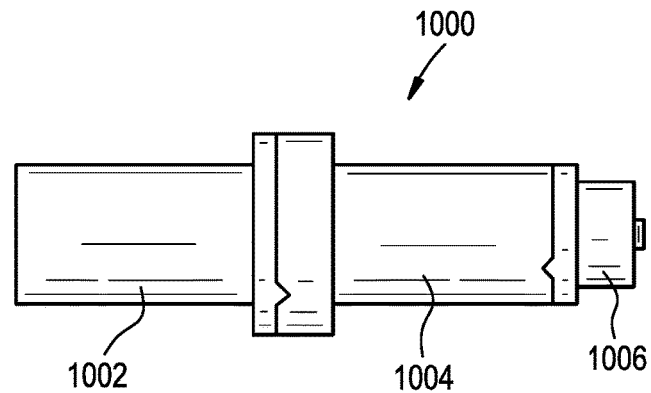
FIG. 11A is a side view of one exemplary embodiment of a multi-part telescope having at least one component with a kinematic interface in which the at least one component and kinematic interface are fabricated using additive manufacturing.
Figure 11B:
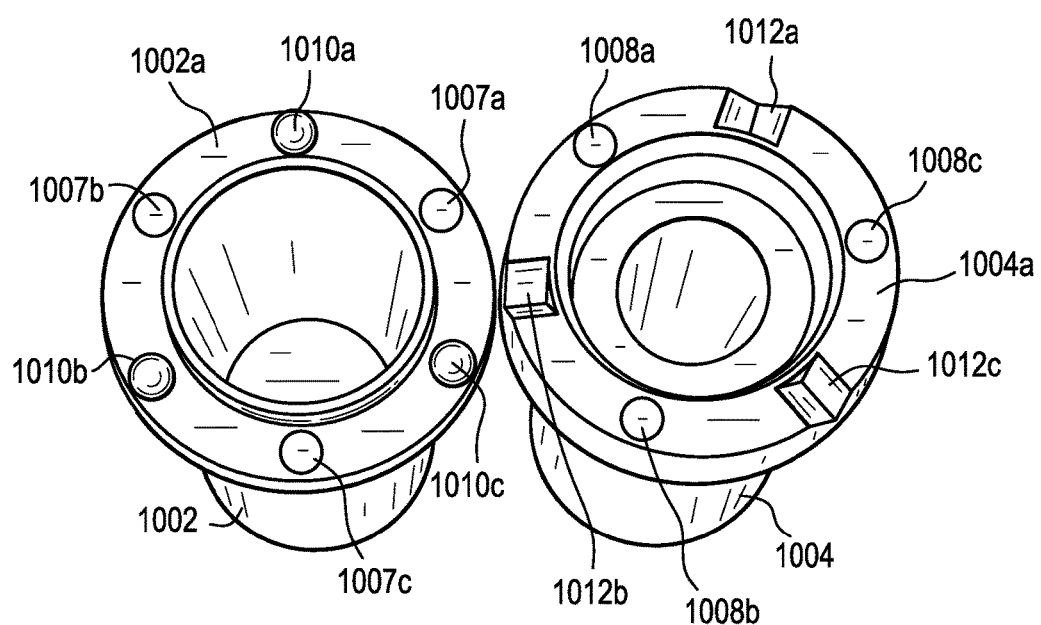
FIG. 11B is a top perspective view of a first component and a second component of the multi-part telescope of FIG. 11A, the first piece having a kinematic interface formed on a top surface thereof and the second piece having a complementary kinematic interface formed on a bottom surface thereof.
Figure 12:
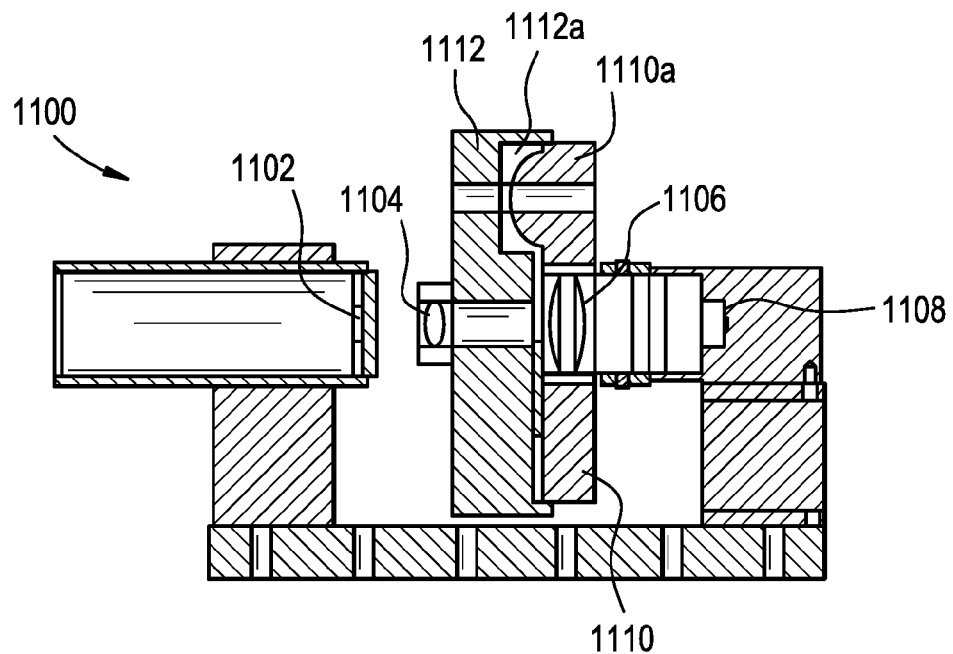
FIG. 12 is a side, semi-transparent view of one exemplary embodiment of a multi-part microscope having at least one component with a kinematic interface in which the at least one component and kinematic interface that are fabricated using additive manufacturing.

A wide variety of assemblies can be formed as a result of the present disclosures, such assemblies extending across any number of industries. FIGS. 11A, 11B, and 12 provide some non-limiting examples of the types of assemblies that can benefit from the use of 3D printed KIs that are used in building such assemblies.

FIGS. 11A and 11B provide an example of an assembly that utilizes KIs in the field of optics, where imprecisely locating assembled components can have detrimental effects on the optical quality of the device. As shown, a telescope 1000 is a three-part (or three-component) assembly made of first part 1002, second part 1004, and third part 1006. Traditionally, it was not cost-effective or easy to manufacture a precisely designed instrument such as a telescope using AM techniques as the optical quality noticeably degrades if the lenses are decentered by more than about 250 µm. The necessary precision for locating the parts is untenable using traditional AM techniques, in part, due to the low quality of the AM fabricating process, as discussed above. However, using the above-described embodiments, each of the three parts 1002, 1004, 1006 include KIs, thus allowing for precision assembly of the parts.

More particularly, as shown in FIG. 11B, a top surface 1002a of the first part 1002 includes three kinematic features, as shown hemispheres 1010a, 1010b, and 1010c, collectively the KI of the first part 1002, and a bottom surface 1004a of the second part 1004 includes complementary kinematic features, as shown v-shaped grooves 1012a, 1012b, and 1012c, collective the KI of the second part 1004. The hemispheres 1010a, 1010b, 1010c and the grooves 1012a, 1012b, 1012c are disposed approximately equidistantly around the circumferences of their respective parts 1002 and 1004, forming an approximately equilateral triangle between themselves on their respective components 1002, 1004. Further, disposed about halfway between the respective kinematic features 1010a-1010c and 1012a-1012c are magnets 1007a, 1007b, 1007c and 1008a, 1008b, 1008c, respectively. The magnets 1007a-1007c and 1008a-1008c likewise form an approximately equilateral triangle between themselves on their respective parts 1002, 1004. The magnets 1007a, 1007b, 1007c and 1008a, 1008b, 1008c can apply a pre-defined pre-load to the parts 1002, 1004, and they can also help keep the parts 1002, 1004 coupled together, although the KCs formed by the KIs of the respective parts 1002, 1004 should be sufficient.

Because of the precise configuration afforded by the KIs of the parts 1002, 1004, the parts 1002, 1004 can be assembled together without any significant degradation in optic quality. This is likewise the same for parts 1004 and 1006, in which one kinematic feature of each of the parts 1004 and 1006 is visible. In practice, the kinematic features of the parts 1004 and 1006 can perform in a manner akin to the kinematic features 1010a-1010c and 1012a-1012c of the parts 1002 and 1004, respectively.

Another example in the field of optics can relate to modular microscope designs having replaceable objective lenses, as shown in FIG. 12. As noted above, KCs can advantageously permit for precision location of components relative to other components in an assembly. Thus, integral KIs can allow for microscopes to have interchangeable lenses that can change the magnification of the microscope with a high degree of precision of maintaining the alignment of the lenses. Such a high degree of location precision can reduce the expertise required to operate and replace microscopes lenses or alleviate the need for plural microscopes.

As shown in FIG. 12, a microscope 1100 can, in general, include lenses 1102, 1106 that are fixed within the microscope 1100, and an interchangeable lens 1104. The interchangeable lens can be housed in a lens housing 1112 that can interface with a detector housing 1110 that houses the lens 1106 and an optical detector 1108. One or both of the lens housing 1112 and the detector housing 1110 can be manufactured using additive manufacturing techniques described herein. For example, the lens housing 1112 and detector housing 1110 can include respective KIs 1112*a*, 1110*a* that can locate the interchangeable lens relative to the housing to ensure that there is no axial offset between the lenses 1102, 1104, 1106. Thus, as noted above, even when the lens housing 1112 is manufactured using additive manufacturing techniques, the integral KI 1112*a* can be used to precisely locate the lens housing 1112 within a post processing machine to ensure dimensional accuracy of the final part (as described further below in the next section).

Figure 13A:
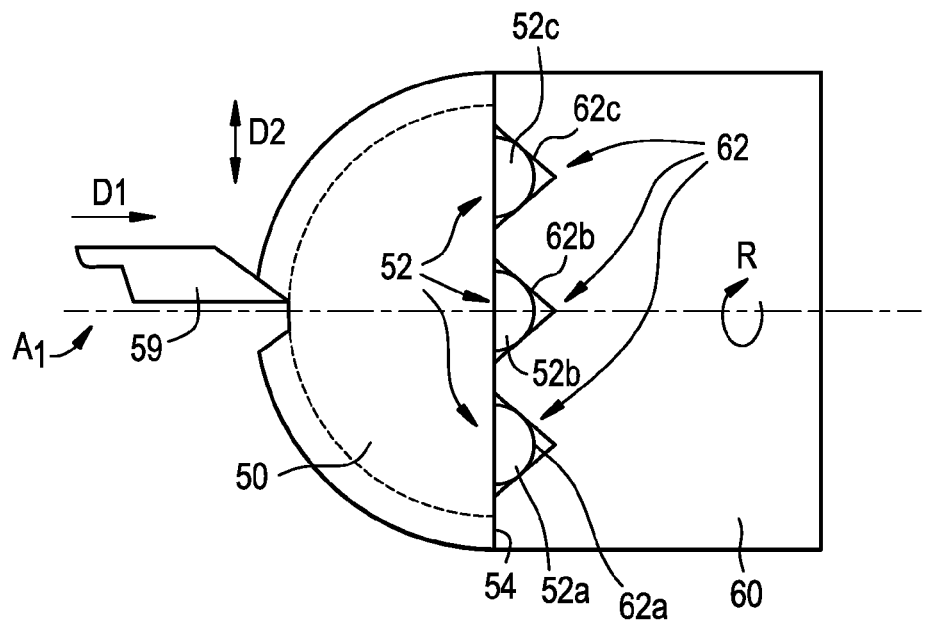
FIG. 13A is a schematic side view of one exemplary embodiment of an AM printed component having a kinematic interface formed on a bottom surface thereof, the kinematic coupling being engaged with a complementary kinematic interface formed in a top surface of a plate associated with a lathe to form a kinematic coupling, the lathe including a shaping tool engaged with a top surface of the AM printed component.

Using Kinematic Features to Precisely Locate Additively Manufactured Components with Respect to Post-Processing Tools Turning to the use of KIs in conjunction with post-processing tools, or post-processing machines, and the like, two examples of post-processing configurations are illustrated in FIGS. 13A and 13B. One skilled in the art will appreciate that the application of the present disclosures can have many advantages when performing post-processing procedures to further modify a component that was printed using techniques like AM. In the present disclosures, the term "post-processing machine" generally refers to an entire machine, while a "post-processing tool" generally refers to a part of the machine that actually performs an action, e.g., an "end effector." Thus, a machine may be a lathe or milling machine, and the related tools may be referred to as "cutting tools," "bits," or the like. Nevertheless, a person skilled in the art will understand that references to a tool can be inclusive of a machine, such that a mill or lathe may themselves be considered tools. Accordingly, the terms "machine" and "tool" may be considered interchangeable in the context of the present application with respect to defining the scope of the disclosure or any resulting claims.

FIG. 13A illustrates an embodiment in which a component 50 uses a KC to precisely locate itself with respect to a tool, as shown a shaping tool 59 of a lathe (not shown), for accurate formation of one or more features in a surface of the component 50. More particularly, the component 50 has a KI 52 that includes three kinematic features, as shown hemispheres 52*a*, 52*b*, and 52*c*, disposed on a bottom surface 54 of the component 50. The component 50 is precisely mounted to a second component 60, as shown a block or other fixture, which itself includes complementary kinematic features 62*a*, 62*b*, and 62*c* (e.g., v-shaped grooves) forming the KI 62 of the second component. This secure, precise KC between the two KIs 52, 62 allows for a post-processing tool, like the shaping tool 59, to modify the first component 50. Any number of modifications to the surface of the first component 50 can be performed. In the illustrated embodiment, first component 50 can be rotated about an axis A1, as is typical with lathes, and the component 50 can be subsequently subjected to both axial forces as the tool 59 is pressed axially in a direction D1, as well as radial forces as the tool 59 moves in a direction D2. Because of the interactions between the KIs 52 and 62, the first component 50 can be removed and subsequently returned for further post-processing that will be precise. The KIs 52, 62 will consistently engage with each other, providing a fixed location that is the same for the first component 50 each time it is placed for post-processing. Likewise, further components that also include a KI akin to the KI 52 can be used for duplicate treatment that the first component 50 received because of the KI interactions. The KIs for further components and the KI 62 will engage each other to provide the same fixed location as the first component 50, and thus the same post-processing procedures can be performed on the further components.

FIG. 13B illustrates use of the present disclosures with a different post-processing tool, as shown a mill (not shown) having a shaping tool 59'. Similar to the lathe embodiment of FIG. 13A, a KC is used to precisely locate a component 50' with respect to the shaping tool 58' for accurate formation of one or more features in a surface of the component 50'. As shown, the component 50' has a KI 52' that includes three kinematic features, as shown hemispheres 52*a*', 52*b*', and 52*c*', disposed on a bottom surface 54' of the component 50'. The component 50' is precisely mounted to a second component 60', as shown a block or other fixture, which itself includes complementary kinematic features 62*a*', 62*b*', and 62*c*' (e.g., v-shaped grooves) forming the KI 62' of the second component. This secure, precise KC between the two KIs 52', 62' allows for a post-processing tool, like the shaping tool 59', to modify the first component 50'. Any number of modifications to the surface of the first component 50' can be performed. In the illustrated embodiment, additional material 58' is provided on the component 50' to offset the hemispheres 52*a*', 52*b*', and 52*c*' so that the component 50' is properly oriented for the milling operation.

While in the illustrated embodiment of FIGS. 13A and 13B the additional material 58' is shown to have an approximately similar footprint as the component 50', it is contemplated that the additional material can have any number of shapes and sizes. For example, the additional material can be in the form of a build plate 58", as shown in FIG. 13C, with an AM-manufactured component 50" disposed on a top surface 58*a*" of the build plate 58" following fabrication of the component 50" onto the build plate 58". The build plate 58" can have a footprint that is twice or even orders of magnitude larger than that of the component 50". It can be sized and shaped, for example, to be complementary to set-up of the AM printer with which it is used to print components like the component 50". A person skilled in the art will recognize what a build plate is, and thus the present disclosure generally provides for configurations in which build plates themselves have KI(s), and thus kinematic features, formed directly on the plate itself and/or coupled to one or more surfaces of the build plate. In some embodiments, the build plate 58" can be prefabricated to include three kinematic features, as shown hemispheres 52*a*", 52*b*", and 52*c*", disposed on a bottom surface 58*b*" of the build plate 58". The kinematic features 52*a*", 52*b*", and 52*c*" can be features that protrude, as shown, and/or features that are formed into the surface (e.g., grooves and the like), depending, at least in part, on the configuration of the object with which the plate forms a KC to set the location of the plate 58" with respect to an AM printer (or other machine or tool). While not illustrated, the build plate 58" can additionally, or alternatively, include kinematic features that protrude and/or features that are formed into the top surface 58*a*", for instance to receive the printed component 50". In other examples, the additional material can be one or more support structures that include, e.g., supports or rafts. Further, the additional material, the support structure, or the build plate can be formed from the same or a different material than the printed component (e.g., component 50', 50", etc.). In some cases, the additional material can be added to insure that the KI can be machined off of, or otherwise removed (e.g., with mechanical separation at a weak interface) from, the component without ruining the component. This can be beneficial in cases where the KI is used only to locate the component within a machine, and the features of the KI would negatively impact the performance of the component in use and/or detract from the aesthetics of the final component. Ultimately, removal of material from the printed component can result in achieving a desired final configuration of the printed component.

In some embodiments, a component can be fabricated on a pre-fabricated kinematic base. Such a pre-fabricated kinematic base can include any kinematic interface discussed herein that have already been subjected to one of the break-in or reforming processes. The AM printer can scan the pre-fabricated base using a laser to index the pre-fabricated base before printing to ensure proper alignment. The use of a pre-fabricated base can be beneficial in a large volume production where a particular kind of component will be fabricated many times. The pre-fabricated kinematic base can allow for the component to be post-processed with a plurality of different tools, or machines, without the need for each component to be broken-in or reformed. Advantageously, the pre-fabricated kinematic base can reduce manufacturing time. Further, the pre-fabricated base can be reused for a plurality of components, which can reduce material costs.

Further, in some embodiments, the component, additional material, or the pre-fabricated kinematic base can include an optical recognition print feature. An optical recognition print feature can be any of a two-dimensional or three-dimensional marking that is designed to be optically recognized by an AM printer, kinematic treatment device, or a post-processing machine to aid in locating the component relative to a particular fixture. The optical recognition print feature can complement the kinematic interface for locating the part in the fixture.

Systems for Precise Additive Manufacturing

Figure 14A:
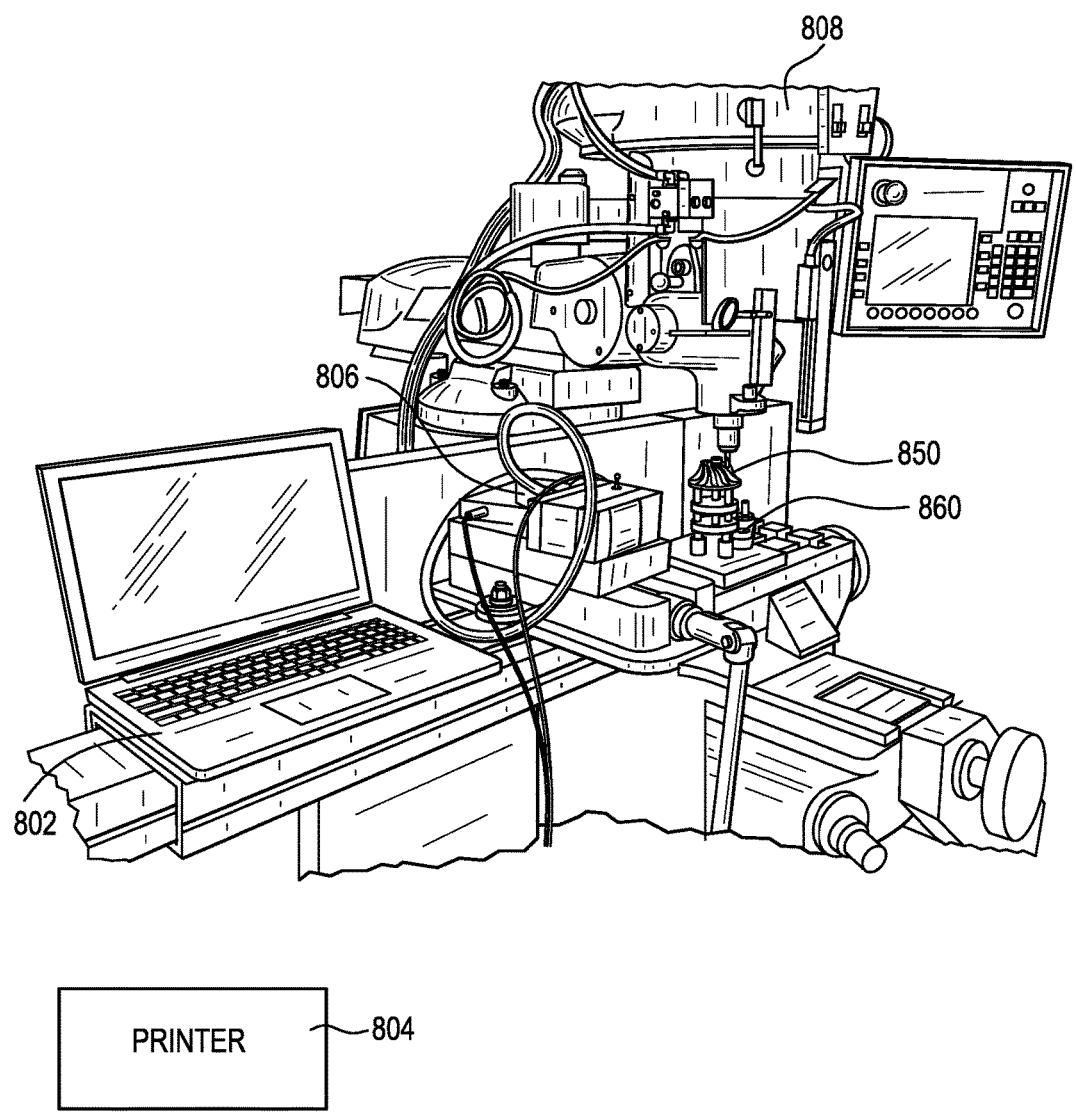
FIG. 14A is a perspective, partially schematic view of one exemplary embodiment of an additive manufacturing system, the system including a computer, a printer, a post-processing machine, a first AM printed component having a kinematic interface formed on a bottom surface thereof, and a second surface associated with a load cell, the second surface and the load cell being fixedly disposed with respect to the post-processing tool and the second surface having a complementary kinematic interface formed on a top surface thereof, the kinematic interface and the complementary kinematic interface being engaged to form a kinematic coupling.
Figure 14B:
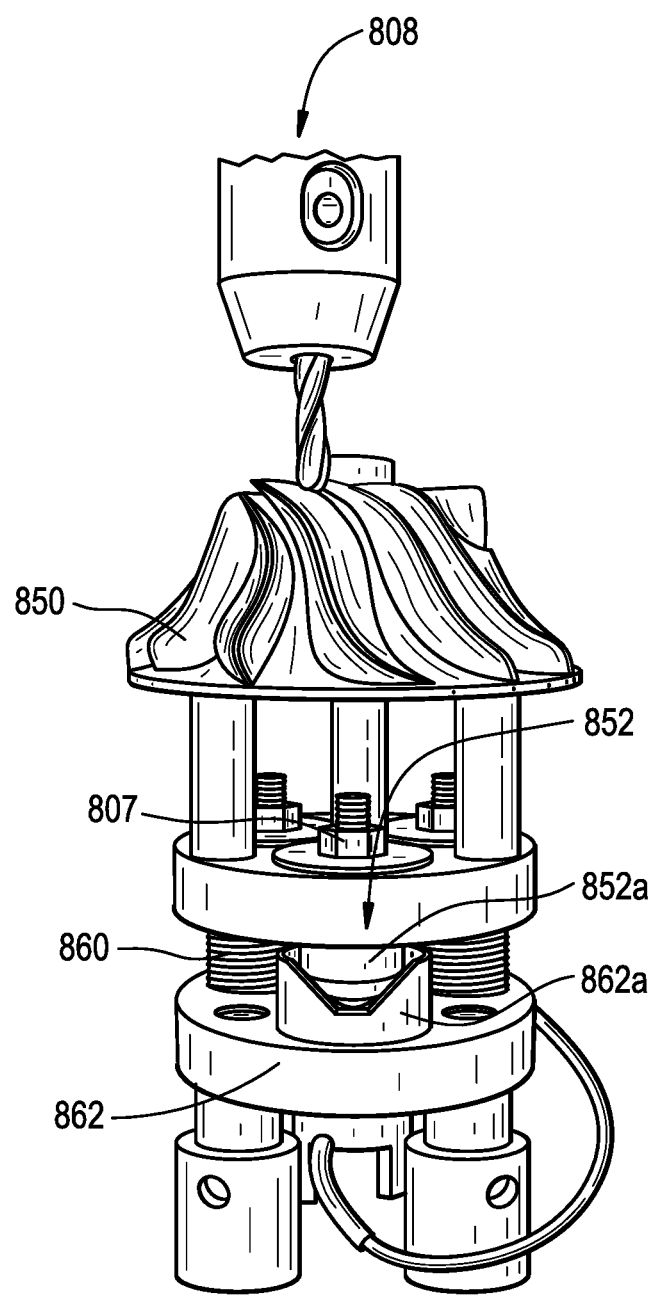
FIG. 14B is a detailed perspective view of the post-processing machine, the AM printed component, and the second surface of FIG. 14A.

FIGS. 14A and 14B illustrate one exemplary embodiment of a system for additively manufacturing a component having a KI with the KI being used to locate the component with respect to a precision locating tool for post-processing procedures. The printed component, a turbine 850, includes a number of intricate features that would be difficult to efficiently and effectively build solely through AM techniques and/or traditional subtractive processes, but by allowing for the turbine 850 to be precisely located with respect to a post-processing machine 808, the turbine 850 can be efficiently and accurately fabricated.

The system 800 includes a computer system 802, a 3D printer 804, an object or fixture 860 having a KI 862 configured to receive a complementary KI of a printed component, a post-processing machine or tool, as shown a mill 808, and load cells 806 connected to a plurality of threaded fasteners 807 for measuring and applying a pre-load to the component.

The computer system 802 can be any known computer system capable of operating the features provided for herein, including the 3D printer 804, the load cells 806, and the post-processing tool 808. Additional details about a computer system that can be the computer system 802 are provided below with respect to FIG. 16B. The computer system 800 can command the printer 804 to print or otherwise fabricate the component 850, which includes a KI 852 having three kinematic features, hemisphere 852a, 852b, and 852c (only one of which is visible). The printed component 850 can be based on plans already stored in the computer system 800, or otherwise provided or derived by the computer system 800. The printer 804 can be any type of 3D printer, and typically is an AM printer. All the different types of AM can be used in conjunction with the system 800, including fused filament fabrication, stereolithographic, selective laser sintering/melting, electron beam melting, binder jet printers, material jet printers, and powder bed fusion printers, among others.

After the printer 804 finishes fabricating the component 850, the KI 852 can be used to KC the component 850 to the fixture 860. As shown, the hemisphere 852a engages a v-shaped groove 862a to form the KC. Additional v-shaped grooves 862b and 862c can also be provided, although they are not visible, to form the KI 862 of the second component or fixture 860. The load cells 806 can be operated using techniques described above to break-in or otherwise treat the kinematic features of the component 850. More particularly, manual or mechanically actuated threaded fasteners 807 can be adjusted in response to force measurements by the load cells 806 to apply a pre-load to the component 850 to break-in the KI 852. While not shown, the system 800 can additionally, or alternatively, include a reformation die or mold to perform any require reforming on the kinematic features. The computer system 802 can control the operation of the load cells 806 and related components.

The treated KI 852 of the component 850 can then be engaged with the KI 862 of the fixture 860 to set a location of the component 850 with respect to the post-processing tool 808. Subsequent post-processing actions, such as milling, drilling, or otherwise removing some material from the component 850 can be performed. Many different post-processing tools can be used in conjunction with the system 800, including but not limited to lathes, mills, plasma cutters, electrical discharge machines, laser cutters, and water jet cutters, among others. The computer system 802 can control the operation of the post-processing tool 808.

Advantageously, the KI formed through the aforementioned processes can be used to precisely locate components in fixtures (e.g., the fixture 860) of post processing tools (e.g., the mill 808). In some embodiments, the fixture 860 can be permanently indexed, or located, relative to the post-processing machine 808 so that the relative location of components 850 can be assumed once the component is located within the fixture using the known KIs. For example, a component 850 can be precisely and repeatably located within the fixture 860 of the mill due to the design of the KI and, often, at least one of a break-in process or a reforming process. As the KI is processed to enhance stiffness from worst-case loading, the component 850 will not measurably deflect from worst-case cutting forces during the milling operation shown in FIG. 13B.

One exemplary use of the workflows and systems disclosed herein is shown in FIG. 15. In a first step 900, a 3D model of the assembly can be loaded into a CAD, or solid modeling, software. The 3D model can include various components that are each fabricated separately. A designer, or engineer, can then determine the locations of the necessary kinematic features of a KI to be fabricated on the individual components based on the requirements of any post-processing and requirements of the overall assembly, 910. In some embodiments, a designer can input the required characteristics into the software, and the software can optimize the locations and types of kinematic features of the KI, as described below with respect to FIGS. 16A-16D. Once the final model, including the KCs, is complete, the components can be fabricated using a print plan that is created using the final model. The component can be printed using an AM printer, 930. Materials that can be used in conjunction with the devices and systems provided for in the present disclosure, are vast, and can depend on a variety of factors, including but not limited to the desired properties of the object being printed (e.g., flexible and strong) and the desired use of the object being printed (e.g., precision optics). As discussed above, the KI on each component may require breaking-in to ensure that the KI offers the required precision to locate the part relative to post-processing machine fixtures and relative to one another, 930. Optionally, or alternatively, the kinematic features of the KI can be reformed to ensure that the KI has the necessary surface characteristics. Once the KI has been properly broken-in and/or reformed, they can be used to precisely locate the component within a post-processing machine tool fixture, 940. The post-processing machine tool can perform any number of post-processing steps to ensure that the final component has the required precision tolerance and surface smoothness, and the component can then be removed, 950. In some embodiments, the KI can be removed from the components after the required post-processing is complete, 960. In other embodiments, the KI can remain on the components to precisely locate the components relative to other components to form the final assembled product, 970.

Determining Locations for Kinematic Features

As discussed above, the use of KIs in AM components can greatly streamline post-processing and thus extend the application of AM parts into the realm of precision engineering design. KIs in AM components can benefit from specific design constraints of the KC, breaking-in the KIs after printing, and/or reforming of the KIs after printing. These workflow processes can account for, and overcome, inherent limitations of KIs that may exist in AM components such as anisotropic material properties, plastic deformation, and printing resolution. Each of the aforementioned workflow processes can be performed alone or in any combination to further enhance the predictability of placement and strength of KIs used with AM components.

One limitation of AM components is that they can suffer from low dimensional accuracy, poor finishes, and limitations of the materials used. These limitations can have a negative impact on the repeatability of locating components using KCs. For example, when printing out components using fused filament fabrication and ABS plastic, the formed KIs can plastically deform as loads are applied. Therefore, it can be desirable to provide design constraints so that resulting KIs can have increased repeatability in precisely locating components on which the KIs are disposed with respect to another component, object, fixture, or the like. In some instances, the design constraints can then be used to formulate a print plan to fabricate, or print, the component.

A first design constraint that can be considered in designing the various KIs, or features thereof, can be what surfaces of a component require post-processing, if any. By understanding what surfaces may require post-processing after the component is printed, a designer can then understand what surfaces would be best to locate the KIs. Alternatively, if the AM component will not be post-processed, understanding how the components may be assembled can inform which surface to locate the KIs.

The design process can additionally be guided by the specific build materials used during the additive manufacturing of the component. Current AM components can be fabricated using a variety of materials including various types of plastic (e.g., ABS) and various types of metals. Each material will have different performance characteristics and will deform differently under an applied load. For example, if the materials used result in a component having anisotropic material properties, it can be helpful to consider how the KIs will be loaded and how the KIs will deform based on the loading. Further, the specific AM process used for fabrication can inform the performance of the component once fabricated.

Similarly, how the KI will be loaded after the components are finally assembled and in use can be considered. For example, whether and to what magnitude allowable deflection of the parts can be after they are coupled can be considered. Further still, how much deflection of the KI may result from any break-in or reformation process performed after the printing of the part can be considered. Other variables that can impact the KI placement and geometry can include the required effective contact radii of the KI, the relative location of the contact point, the required coupling stiffness, known forces to be applied to the KI (or more generally to a printed component on which the KI is disposed, which can then be applied to the KI) and/or the need for controlled over-constraint. Using various combinations of the aforementioned variables and constraints, an optimal KI type and optimal KI placement for the required repeatability, accuracy, and/or rigidity of the component can be determined. In other exemplary embodiments, the KI can be added to a component fabricated with AM using conventional machining techniques. Those machining techniques can include milling, turning, grinding, and polishing. Further, KIs can additionally be formed with a reformation process. Using the various combinations of the aforementioned design constraints and the resulting design, a computer system can then formulate a print plan for use in printing the component having the KI.

Figure 16A:
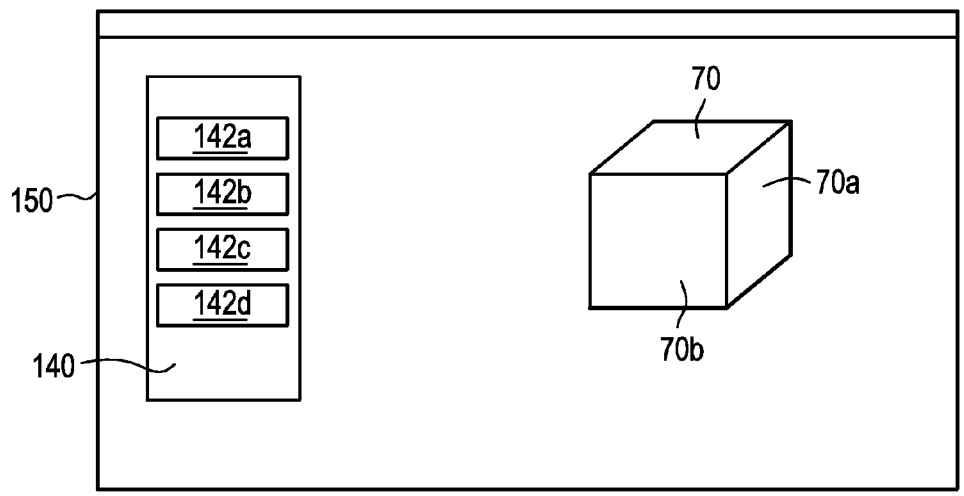
FIG. 16A is a schematic view of one exemplary embodiment of a screenshot of one exemplary software program configured to determine a preferred location to fabricate at least one kinematic feature on at least one surface of a to-be-printed AM printed component.
Figure 16B:
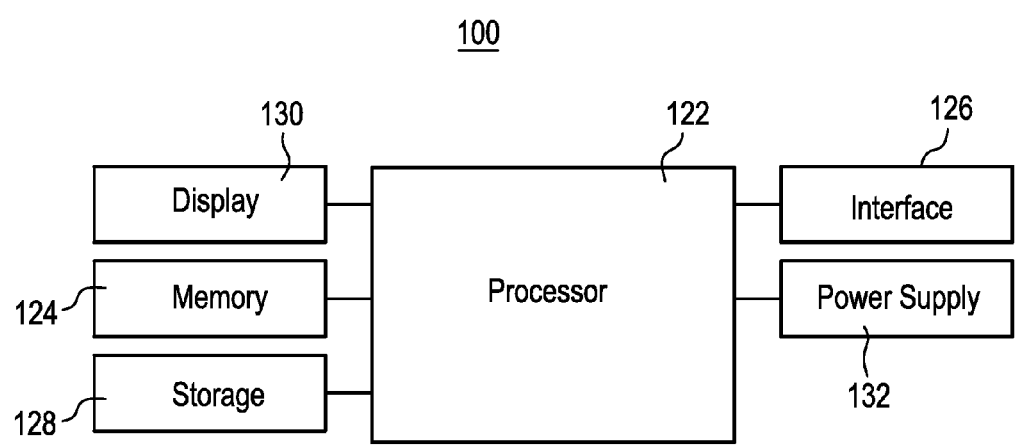
FIG. 16B is a schematic block diagram of one exemplary embodiment of a computer system for operating the software program of FIG. 16A.

FIGS. 16A and 16B provide additional information about how such a computer system can be set-up and a program operated to perform this analysis. As provided for in these figures and the related descriptions above and forthcoming, the design of the KI and associated print plans can be performed using software 150 running on a computer system 100. For example, the software 150 can be a standalone software suite that can run on a computer system, web browser, or a general controller 100. In other embodiments, the software 150 can be an add-on, or applet, that can run within a computer-aided design software or solid modeling software, as shown in FIG. 16A. In either case, the software can determine optimal KI type and locations on a 3D model of a component 70 or an assembly, and prepare a print plan to be outputted to a printer for fabrication of the component 70.

FIG. 16B illustrates a block diagram of the physical components of an exemplary embodiment of the controller, or computer, 100 that can run the software 150. Although an exemplary computer 100 is depicted and described herein, it will be appreciated that this is for sake of generality and convenience. In other embodiments, the computer 100 may differ in architecture and operation from that shown and described here. The computer 100 can be a tablet computer, mobile device, smart phone, laptop computer, desktop computer, cloud-based computer, server computer, multiple of the above, and so forth.

The illustrated computer 100 can include a processor 122 which controls the operation of the computer, for example by executing embedded software, operating systems, device drivers, application programs, and so forth. The processor 122 can include any type of microprocessor or central processing unit (CPU), including programmable general-purpose or special-purpose processors and/or any of a variety of proprietary or commercially-available single or multi-processor systems. As used herein, the term processor can refer to microprocessors, microcontrollers, ASICs, FPGAs, PICs, processors that read and interpret program instructions from internal or external memory or registers, and so forth. The computer 100 can include a memory 124, which can provide temporary or permanent storage for code to be executed by the processor 122 or for data that is processed by the processor. The memory 124 can include read-only memory (ROM), flash memory, one or more varieties of random access memory (RAM), and/or a combination of memory technologies. The various components of the computer 100 can be interconnected via any one or more separate traces, physical busses, communication lines, etc.

The computer 100 can include an interface 126, such as a communication interface or an I/O interface. A communication interface can enable the computer 100 to communicate with remote devices (e.g., other controllers or computer systems) over a network or communications bus (e.g., a universal serial bus). An I/O interface can facilitate communication between one or more input devices, one or more output devices, and the various other components of the computer 100. For example, the interface 126 can communicate with an AM printer, break-in load supplier, and/or various post-processing tools. Exemplary input devices include touch screens, mechanical buttons, keyboards, and pointing devices. Additional exemplary output devices include a projector, electronic display screens, and speakers. The computer 100 can include a storage device 128, which can include any conventional medium for storing data in a non-volatile and/or non-transient manner. The storage device 128 can thus hold data and/or instructions in a persistent state (i.e., the value is retained despite interruption of power to the computer 100). The storage device 128 can include one or more hard disk drives, flash drives, USB drives, optical drives, various media disks or cards, and/or any combination thereof and can be directly connected to the other components of the computer 100 or remotely connected thereto, such as through the communication interface. The computer 100 can include a display 130, and can generate images to be displayed thereon. In some embodiments, the display 130 can be a vacuum fluorescent display (VFD), an organic light-emitting diode (OLED) display, or a liquid crystal display (LCD). The computer 100 can include a power supply 132 and appropriate regulating and conditioning circuitry. Exemplary power supplies include batteries, such as polymer lithium ion batteries, or adapters for coupling the computer 100 to a DC or AC power source (e.g., a USB adapter or a wall adapter).

Figure 16C:
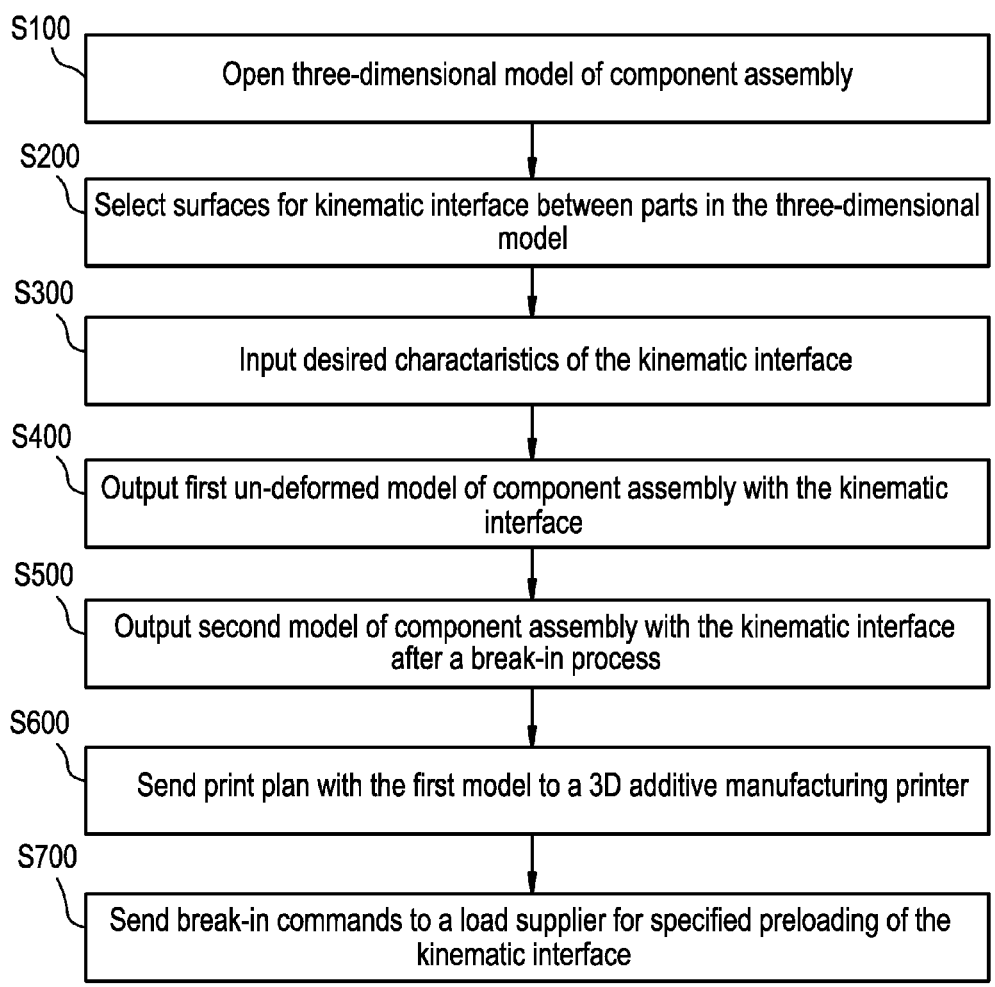
FIG. 16C is a schematic flowchart of one exemplary embodiment of an algorithm of the software program of FIG. 16A.

The software 150 is schematically represented as an algorithm illustrated in FIG. 16C, with the various steps related to the various determinations described above shown. In use, the user can open, load, or download, a 3D model of the component 70, S100, as shown in FIG. 16A. Once the file has loaded the model of the component 70 within the software 150, the user can use any suitable input device, e.g. a mouse or stylist, to select the desired surfaces, e.g., 70a, 70b, to place the kinematic features of a KI, S200. The user can additionally input any number of additional constraints noted above, including, but not limited to, the desired coupling stiffness, the cutting force, the maximum deflection, etc., into an input window 140 on screen, S300. The input window 140 can include various text input boxes, or pull down options, 142a, 142b, 142c, and 142d to allow the user to input the desired constrains.

Based upon the constraints inputted into the system 100, the software 150 can output a modified 3D model of the component 70 including the optimal KI types and locations of the individual kinematic features, S400. Additionally, the software 150 can determine the proper break-in forces and/or reformation procedures needed for the KI type and material of the component 70 and optionally output a second modified 3D model of the component 70 showing the KIs after the break-in process, S500. Alternatively, the software 150 may not provide a second model of the component 70. In a further alternative, the software 150 can iteratively determine the optimal locations of the kinematic features based, in part, on the deformation that can occur from a break-in procedure. Once the optimal location and type of the kinematic features of the KI are determined, the model can be updated to prepare a print plan for fabrication. The software 150 can then execute a printing operation to fabricate the component using an attached AM printer and the print plan, S600. Further, if the software 150 determines the optimal break-in loading, the software 150 can output those commands to a load supplier, such a load cell and a displacement sensor, S700.

In some embodiments, the system can be designed to fabricate multi-material AM components using one or more AM printers. For example, a component can be partially fabricated using a first material. The partially fabricated component can include the required KI and the KI of the component can then be subjected to a break-in process. In some embodiments, the post processing machines can be used to machine certain features into the partially fabricated component. The partially fabricated component can then be placed back into the AM printer to complete the AM fabrication using the same, or a second, material to create complex structures. The KI can ensure that the component is correctly and accurately located in the fixtures of the post-processing machines and the AM fabricator to allow for precision-multi-part manufacturing.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for additive manufacturing, comprising:
obtaining a three-dimensional model of a component to be printed;
formulating a print plan based on the three-dimensional model of the component, the print plan including one or more planned kinematic interfaces associated with at least one planned surface of a planned component of the print plan, wherein the planned component of the print plan, the at least one planned surface, and the one or more planned kinematic interfaces correspond to the component to be printed, at least one surface of the component to be printed, and one or more kinematic interfaces to be associated with the at least one surface of the component to be printed, respectively;
printing the component based on the print plan such that the at least one surface of the component has the one or more kinematic interfaces associated therewith; and
deforming the one or more kinematic interfaces by imparting a predetermined load on the one or more kinematic interfaces over a period of time.

2. The method of claim 1, further comprising reforming the one or more kinematic interfaces by directing the one or more kinematic interfaces against a contact surface to change at least one of a shape and a surface texture of the one or more kinematic interfaces.

3. The method of claim 2, wherein reforming the one or more kinematic interfaces further comprises heating the contact surface to cause at least a portion of the one or more kinematic interfaces to more easily change at least one of the shape and the surface texture.

4. The method of claim 1, further comprising engaging the one or more kinematic interfaces with one or more complementary kinematic interfaces of a second component to form a kinematic coupling between the printed component and the second component.

5. The method of claim 4, wherein a kinematic interface of the one or more kinematic interfaces and a complementary kinematic interface of the one or more complementary kinematic interfaces are configured such that at least six distinct points on the kinematic interface receive a load to maintain a stationary configuration of the printed component with respect to the second component.

6. The method of claim 1, wherein the at least six distinct points on the kinematic interface that receive a load to maintain a stationary configuration of the printed component with respect to the second component are exactly six distinct points on the kinematic interface.

7. The method of claim 1, further comprising:
using the one or more kinematic interfaces to locate the printed component at a desired location with respect to a tool; and
performing one or more post-processing actions using the tool.

8. The method of claim 7, wherein performing one or more post-processing actions further comprises removing at least one feature of the one or more kinematic interfaces.

9. The method of claim 7, wherein performing one or more post-processing actions further comprises removing material from the printed component that is not the one or more kinematic interfaces to arrive at a desired final configuration of the printed component.

10. The method of claim 1, wherein at least one feature of the one or more kinematic interfaces is at least one of a quasi-kinematic interface and an elastically-averaged interface.

11. The method of claim 1, wherein at least one feature of the one or more kinematic interfaces comprises at least one of a portion of a spherical surface and a v-shaped groove.

12. The method of claim 1, wherein formulating a print plan based on the three-dimensional model of the component further comprises identifying a location on the at least one planned surface at which the one or more planned kinematic interfaces is to be printed based on at least one of a desired coupling stiffness of the one or more planned kinematic interfaces, one or more forces to be applied to the one or more planned kinematic interfaces, and a desired maximum deflection for the one or more planned kinematic interfaces.

13. A method for additively manufacturing a three-dimensional object, comprising:
providing a three-dimensional model of a component to be printed by an additive manufacturing printer;
specifying at least one surface of the component to be printed onto which one or more kinematic interfaces are to be printed;
specifying at least one parameter that impacts a preferred location of the one or more kinematic interfaces on the specified at least one surface, the at least one parameter being selected from at least one of a desired coupling stiffness of the one or more kinematic interfaces, one or more forces to be applied to the one or more planned kinematic interfaces, and a desired maximum deflection for the one or more kinematic interfaces; and
instructing the additive manufacturing printer to print the component such that the one or more kinematic interfaces are disposed on the specified at least one surface at the preferred location,
wherein a controller is configured to determine the preferred location based on the specified at least one surface of the component and the specified at least one parameter.

14. The method of claim 13,
wherein instructing the additive manufacturing printer to print further comprises deforming the one or more kinematic interfaces by applying a determined amount of load thereto, and
wherein the controller is configured to determine the determined amount of load based on the specified at least one parameter.

15. The method of claim 13,
wherein instructing the additive manufacturing printer to print further comprises reforming the one or more kinematic interfaces by directing the one or more kinematic interfaces against a contact surface to change at least one of a shape and a surface texture of the one or more kinematic interfaces, and
wherein the controller is configured to determine which and how much to change of the at least one of the shape and the surface texture of the one or more kinematic interfaces based on the specified at least one parameter.

16. The method of claim 13, further comprising:
positioning the printed component with respect to a post-processing tool by forming a kinematic coupling between the one or more kinematic interfaces and one or more complementary kinematic interfaces associated with the post-processing tool; and
instructing the post-processing tool to modify the printed component.

17. The method of claim 16, wherein a kinematic interface of the one or more kinematic interfaces and a complementary kinematic interface of the one or more complementary kinematic interfaces are configured such that at least six distinct points on the kinematic interface receive a load to maintain a stationary configuration of the printed component with respect to the post-processing tool.

18. The method of claim 17, wherein the at least six distinct points on the kinematic interface that receive a load to maintain a stationary configuration of the printed component with respect to the post-processing tool are exactly six distinct points on the kinematic interface.

19. The method of claim 13, further comprising operating a post-processing tool to remove at least one feature of the one or more kinematic interfaces.

20. The method of claim 13, further comprising operating a post-processing tool to remove material from the printed component that is not the one or more kinematic interfaces to arrive at a desired final configuration of the printed component.

21. The method of claim 13, wherein at least one feature of the one or more kinematic interfaces is at least one of a quasi-kinematic interface and an elastically-averaged interface.

22. The method of claim 13, wherein at least one feature of the one or more kinematic interfaces comprises at least one of a portion of a spherical surface and a v-shaped groove.

23. A method for additive manufacturing, comprising:
obtaining a three-dimensional model of a component to be printed;

formulating a print plan based on the three-dimensional model of the component, the print plan including one or more planned kinematic interfaces associated with at least one planned surface of a planned component of the print plan, wherein the planned component of the print plan, the at least one planned surface, and the one or more planned kinematic interfaces correspond to the component to be printed, at least one surface of the component to be printed, and one or more kinematic interfaces to be associated with the at least one surface of the component to be printed, respectively;

printing the component based on the print plan such that the at least one surface of the component has the one or more kinematic interfaces associated therewith; and reforming the one or more kinematic interfaces by directing the one or more kinematic interfaces against a contact surface to change at least one of a shape and a surface texture of the one or more kinematic interfaces.

24. The method of claim 23, wherein reforming the one or more kinematic interfaces further comprises heating the contact surface to cause at least a portion of the one or more kinematic interfaces to more easily change at least one of the shape and the surface texture.

25. The method of claim 23, further comprising:
using the one or more kinematic interfaces to locate the printed component at a desired location with respect to a tool; and
performing one or more post-processing actions using the tool.

26. The method of claim 23, wherein formulating a print plan based on the three-dimensional model of the component further comprises identifying a location on the at least one planned surface at which the one or more planned kinematic interfaces is to be printed based on at least one of a desired coupling stiffness of the one or more planned kinematic interfaces, one or more forces to be applied to the one or more planned kinematic interfaces, and a desired maximum deflection for the one or more planned kinematic interfaces.

27. A method for additive manufacturing, comprising:
obtaining a three-dimensional model of a component to be printed;
formulating a print plan based on the three-dimensional model of the component, the print plan including one or more planned kinematic interfaces associated with at least one planned surface of a planned component of the print plan, wherein the planned component of the print plan, the at least one planned surface, and the one or more planned kinematic interfaces correspond to the component to be printed, at least one surface of the component to be printed, and one or more kinematic interfaces to be associated with the at least one surface of the component to be printed, respectively;

printing the component based on the print plan such that the at least one surface of the component has the one or more kinematic interfaces associated therewith;
using the one or more kinematic interfaces to locate the printed component at a desired location with respect to a tool; and
performing one or more post-processing actions using the tool.

28. The method of claim 27, wherein performing one or more post-processing actions further comprises removing at least one feature of the one or more kinematic interfaces.

29. The method of claim 27, wherein performing one or more post-processing actions further comprises removing material from the printed component that is not the one or more kinematic interfaces to arrive at a desired final configuration of the printed component.

30. The method of claim 27, wherein formulating a print plan based on the three-dimensional model of the component further comprises identifying a location on the at least one planned surface at which the one or more planned kinematic interfaces is to be printed based on at least one of a desired coupling stiffness of the one or more planned kinematic interfaces, one or more forces to be applied to the one or more planned kinematic interfaces, and a desired maximum deflection for the one or more planned kinematic interfaces.

31. A method for additive manufacturing, comprising:
obtaining a three-dimensional model of a component to be printed;
formulating a print plan based on the three-dimensional model of the component, the print plan including one or more planned kinematic interfaces associated with at least one planned surface of a planned component of the print plan, wherein the planned component of the print plan, the at least one planned surface, and the one or more planned kinematic interfaces correspond to the component to be printed, at least one surface of the component to be printed, and one or more kinematic interfaces to be associated with the at least one surface of the component to be printed, respectively; and
printing the component based on the print plan such that the at least one surface of the component has the one or more kinematic interfaces associated therewith,
wherein formulating a print plan based on the three-dimensional model of the component further comprises identifying a location on the at least one planned surface at which the one or more planned kinematic interfaces is to be printed based on at least one of a desired coupling stiffness of the one or more planned kinematic interfaces, one or more forces to be applied to the one or more planned kinematic interfaces, and a desired maximum deflection for the one or more planned kinematic interfaces.

* * * * *